(12) United States Patent
Corcoran

(10) Patent No.: US 10,491,819 B2
(45) Date of Patent: Nov. 26, 2019

(54) PORTABLE SYSTEM PROVIDING AUGMENTED VISION OF SURROUNDINGS

(71) Applicant: FotoNation Limited, Galway (IE)

(72) Inventor: Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 27 days.

(21) Appl. No.: 15/654,465

(22) Filed: Jul. 19, 2017

(65) Prior Publication Data

US 2018/0330527 A1 Nov. 15, 2018

Related U.S. Application Data

(60) Provisional application No. 62/504,102, filed on May 10, 2017.

(51) Int. Cl.
*G09G 5/00* (2006.01)
*H04N 5/232* (2006.01)
(Continued)

(52) U.S. Cl.
CPC ....... *H04N 5/23238* (2013.01); *A42B 3/0426* (2013.01); *G02B 27/017* (2013.01); *G06K 9/00201* (2013.01); *G06K 9/00671* (2013.01); *G06K 9/6202* (2013.01); *G06K 9/6267* (2013.01); *G06T 11/60* (2013.01); *G06T 19/006* (2013.01); *H04N 5/2328* (2013.01); *H04N 5/23216* (2013.01); *H04N 5/23219* (2013.01); *H04N 5/23258* (2013.01); *H04N 5/23267* (2013.01); *H04N 5/23293* (2013.01); *H04N 5/23296* (2013.01); *H04N 5/23299* (2018.08); *H04N 5/232945* (2018.08); *H04N 5/247* (2013.01); *H04N 5/332* (2013.01); *H04N 7/181* (2013.01); *H04N 13/344* (2018.05); *H04N 13/376* (2018.05); *H04N 13/378* (2018.05); *H04N 13/38* (2018.05); *H04N 13/398* (2018.05); *G02B 2027/014* (2013.01); *G02B 2027/0123* (2013.01); *G02B 2027/0138* (2013.01); *G06K 2009/00738* (2013.01); *H04N 13/243* (2018.05)

(58) Field of Classification Search
CPC .................. G02B 27/017; G06F 3/012; G09G 2300/023; H04N 21/21805; H04N 5/23238; H04N 5/7491
See application file for complete search history.

(56) References Cited

U.S. PATENT DOCUMENTS 7,916,897 B2 3/2011 Corcoran et al.
8,170,294 B2 5/2012 Nanu et al.
(Continued)

FOREIGN PATENT DOCUMENTS

KR 1020160155256 * 11/2016 ........... G06T 3/4038

*Primary Examiner* — Weiming He

(57) ABSTRACT

A portable system providing augmented vision of surroundings. In one embodiment the system includes a helmet, a plurality of camera units and circuitry to generate a composite field of view from channels of video data. The helmet permits a user to receive a first field of view in the surroundings based on optical information received directly from the surroundings with the user's natural vision. The camera units are mounted about the helmet to generate the multiple channels of video data. Each camera channel captures a different field of view of a scene in a region surrounding the helmet.

21 Claims, 14 Drawing Sheets

(51) Int. Cl.
  *G06T 19/00*      (2011.01)
  *H04N 7/18*       (2006.01)
  *H04N 13/344*     (2018.01)
  *H04N 13/376*     (2018.01)
  *H04N 13/378*     (2018.01)
  *H04N 13/38*      (2018.01)
  *H04N 13/398*     (2018.01)
  *A42B 3/04*       (2006.01)
  *G06K 9/00*       (2006.01)
  *G06T 11/60*      (2006.01)
  *H04N 5/247*      (2006.01)
  *H04N 5/33*       (2006.01)
  *G02B 27/01*      (2006.01)
  *G06K 9/62*       (2006.01)
  *H04N 13/243*     (2018.01)

(56) References Cited

U.S. PATENT DOCUMENTS

| | | |
|---|---|---|
| 8,385,610 B2 | 2/2013 | Corcoran et al. |
| 8,643,951 B1* | 2/2014 | Wheeler .................. G06F 3/012 |
| | | 359/630 |
| 8,872,887 B2 | 10/2014 | Bigioi et al. |
| 8,934,680 B2 | 1/2015 | Corcoran et al. |
| 8,995,715 B2 | 3/2015 | Sultana et al. |
| 9,224,034 B2 | 12/2015 | Steinberg et al. |
| 9,242,602 B2 | 1/2016 | Corcoran et al. |
| 9,262,807 B2 | 2/2016 | Stec et al. |
| 9,280,810 B2 | 3/2016 | Stec et al. |
| 9,398,209 B2 | 7/2016 | Corcoran et al. |
| 2006/0284786 A1* | 12/2006 | Takano .................. G06F 3/1462 |
| | | 345/1.1 |
| 2010/0061636 A1* | 3/2010 | Fukushima ........ G06K 9/00261 |
| | | 382/190 |
| 2014/0030709 A1 | 1/2014 | Prasher et al. |
| 2015/0138239 A1* | 5/2015 | Kim ...................... G06F 3/1446 |
| | | 345/634 |
| 2016/0010403 A1 | 4/2016 | Steinberg et al. |
| 2016/0309827 A1* | 10/2016 | Dodson .................... A42B 3/30 |
| 2018/0146138 A1* | 5/2018 | Jeon ...................... G06T 3/4038 |
| 2018/0249087 A1* | 8/2018 | Arnold ..................... G06F 3/16 |

\* cited by examiner

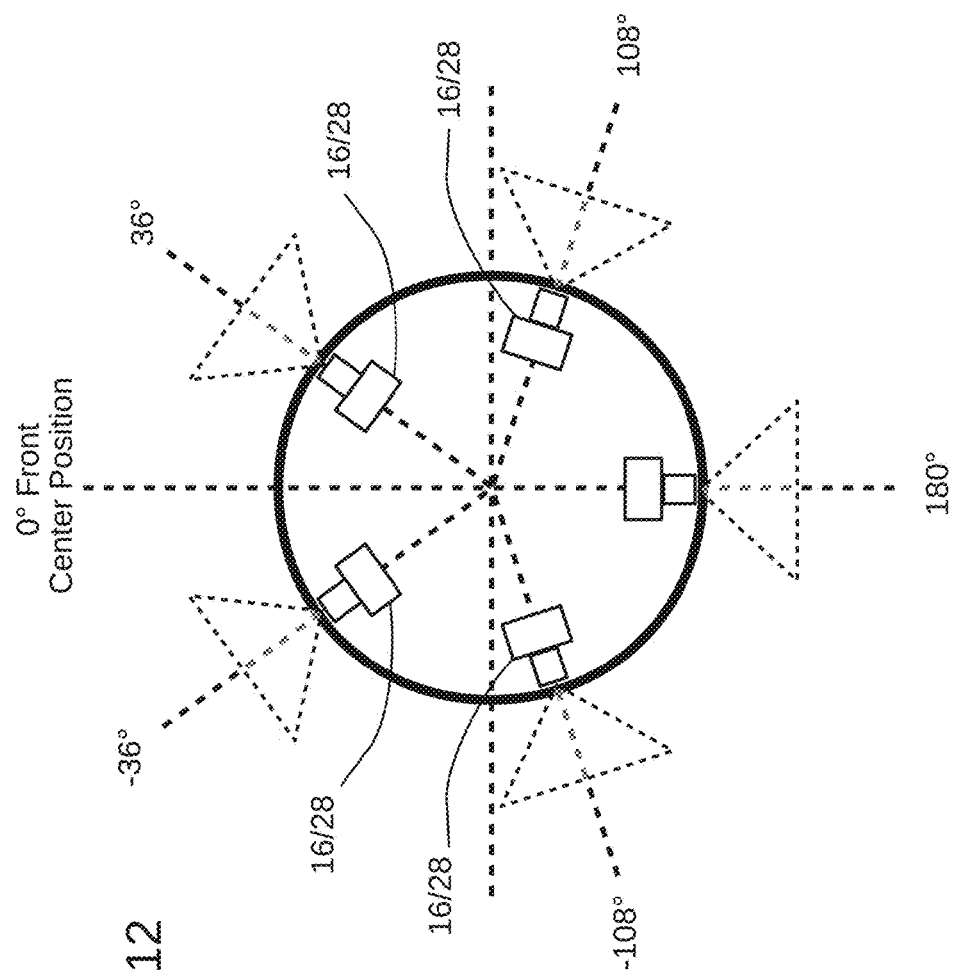

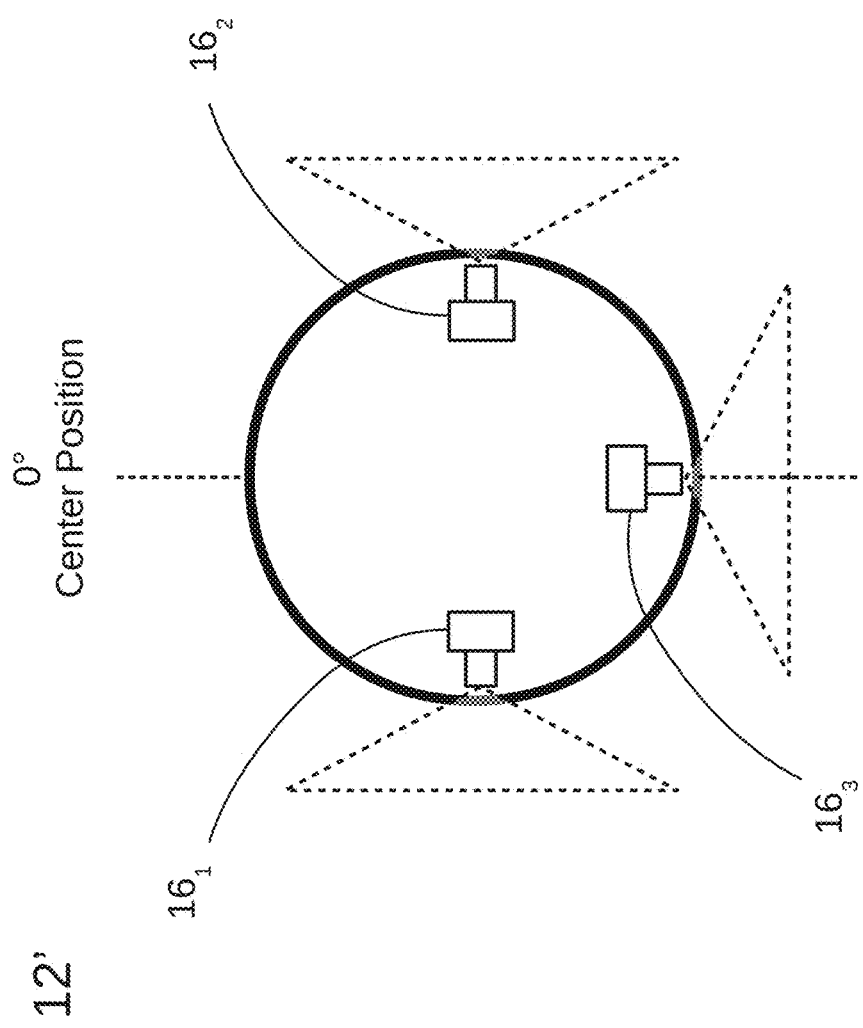

Lean Left (Roll)

Lean Right (Roll)

Pitch Downward

Pitch Upward

Head turn right (Yaw)

Head turn left (Yaw)

Head in normal upright position

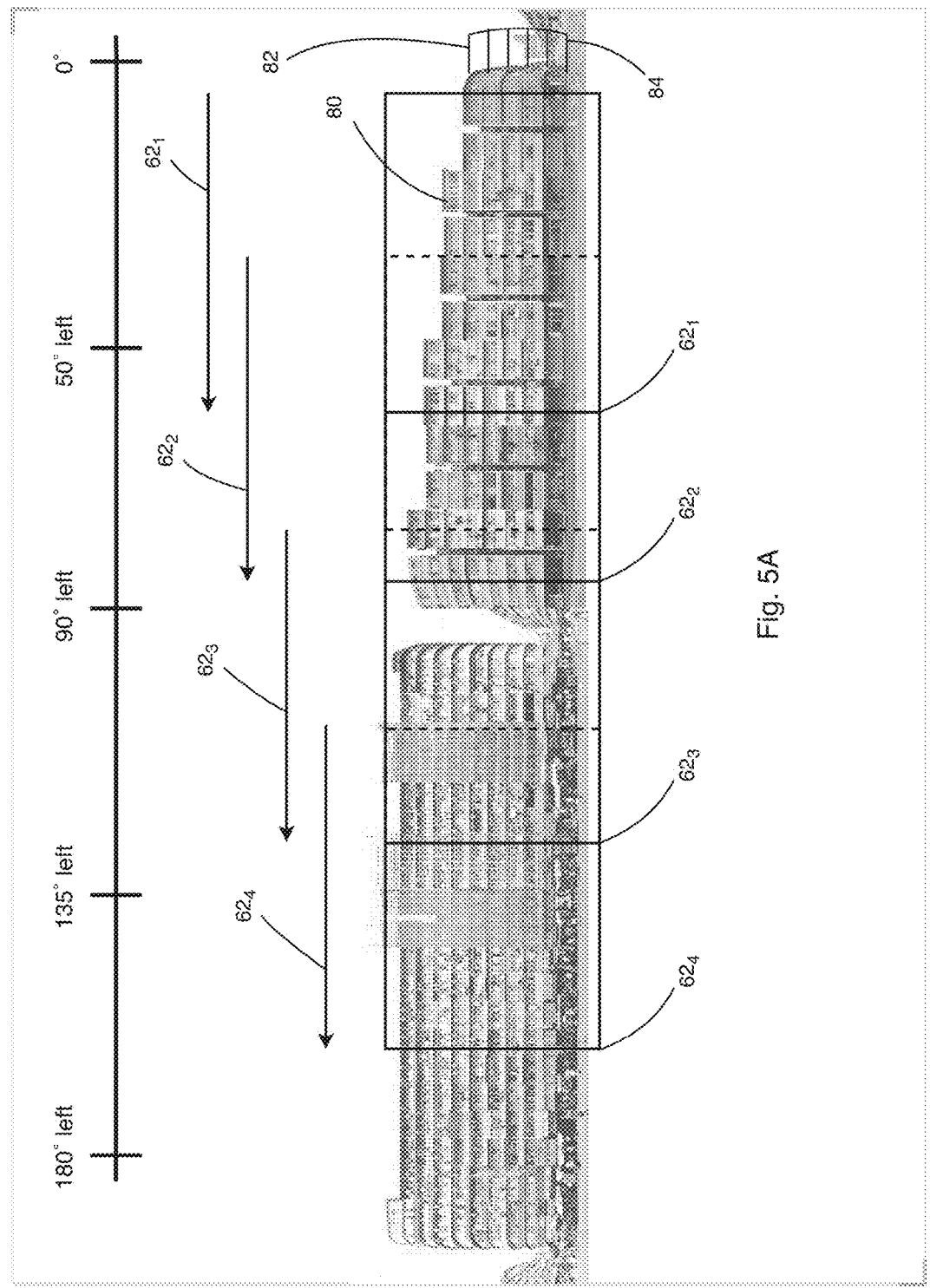

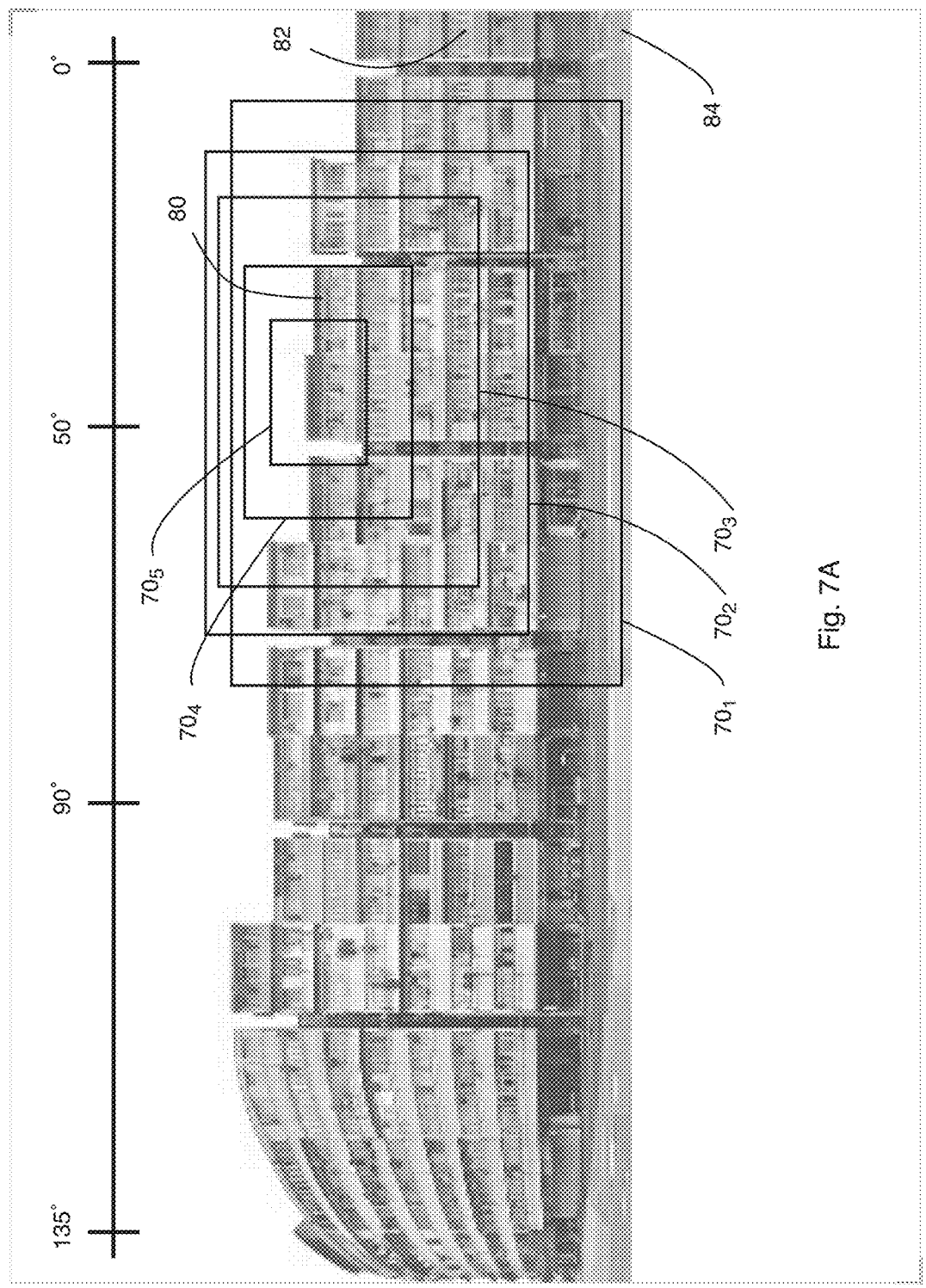

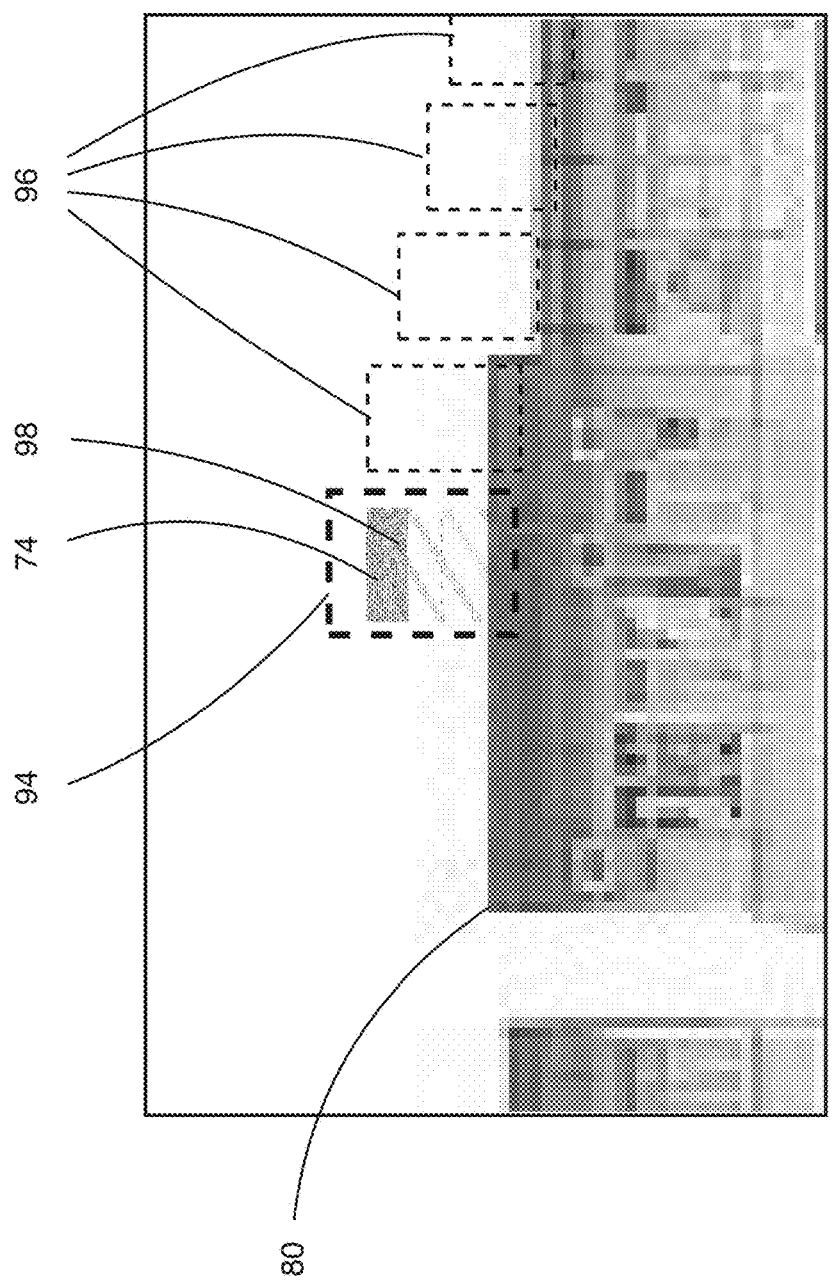

PORTABLE SYSTEM PROVIDING AUGMENTED VISION OF SURROUNDINGS

CLAIM OF PRIORITY AND RELATED APPLICATIONS

This application claims priority to U.S. Provisional Patent Application 62/504,102 filed May 10, 2017, and is related to U.S. Pat. Nos. 7,916,897, 8,170,294, 8,934,680; 8,872,887, 8,995,715, 8,385,610, 9,224,034, 9,242,602, 9,262,807, 9,280,810, 9,398,209, U.S. patent application Ser. No. 13/862,372, filed Apr. 12, 2013, U.S. patent application Ser. No. 14/971,725, filed Dec. 16, 2015 and U.S. patent application Ser. No. 15/591,321, filed May 10, 2017 all of which are assigned to the assignee of the present application and hereby incorporated by reference.

FIELD OF THE INVENTION

This invention relates to systems and methods for monitoring activity in a region. An embodiment of the invention relates to direct viewing of a physical environment supplemented with camera vision views of adjoining surroundings, which views enhance situational awareness. Systems and methods are also provided for detection of classes of objects or monitoring of activities in a region surrounding a person. In one example, a vision system monitors and displays movements of objects and identifies potential threats.

BACKGROUND OF THE INVENTION

Augmented Reality (AR) systems have, to a limited extent, integrated camera vision with a person's direct view of surroundings. In motor vehicle applications, images acquired with camera vision supplement a driver's direct field of view by displaying a rear view in the user's field of natural vision. Such a system may be integrated with a driver's head gear, such as a motorcycle helmet.

In other AR applications, heads-up elements are overlaid on helmet visors. The displays present visual aids while a worker performs an inspection or repair. These assemblies present a combination of normal forward vision and high quality, pre-recorded video displays. In aviation applications head-mounted systems receive feeds from cameras mounted about an aircraft to receive scenes outside an aircraft. The systems are programmed to change camera viewing angles based on similar changes in angle of head turn by the pilot. With a turn of the head the pilot can "look" in a selected direction to view a scene along the same direction outside the aircraft. Simultaneously, head mounted displays may also present information such as altitude, attitude, speed and direction. This facilitates efforts of pilots to keep their eyes on the view ahead instead of frequently looking down to check instrument displays. The foregoing enhancement features largely augment the field of view normally obtainable with direct vision.

There is continued need to improve the safety and success of those in harm's way, especially for ground forces, first responders at disaster scenes and personnel responsible for monitoring terrorist activities. There is a widespread need to improve real-time situational awareness for militia exposed to dynamic and unpredictable changes and to improve reaction times to threats in order to quickly mitigate losses.

SUMMARY OF THE INVENTION

An embodiment of the invention incorporates a series of consumer imaging modules to provide multi-camera surround vision that augments the natural vision of a user. The figures illustrate application of a vision system for foot patrol in hostile territory where there is a need for 360° visual awareness to supplement normal direct vision of surroundings without obscuring the user's normal eyesight field of view. Multiple camera modules may be arranged about the outer surface of a wearable unit which is illustrated as a helmet for a military application. In one embodiment, a pair of displays is positioned to be conveniently flipped above or below a region reserved for the wearer's natural vision field of view. Electronics for video processing, template matching and display management are incorporated into the helmet.

In one series of embodiments, a wearable camera vision system selectively assimilates multi-channel video information into composite fields of view. In one example the system provides a separate composite field of view on each side of the wearer of the system to augment the user's natural vision with camera vision peripheral views. Camera vision views and scans through composite fields of view are selectable by the user-wearer, who may view discrete portions of the surrounding scene or wide angle fields of view capturing left and right peripheral views. Head cues control the display of captured fields of view in select portions of peripheral views. Left and right camera vision peripheral views may each range up to 180°.

Embodiments of the wearable camera vision system include an object detection and classification system. Image data acquired through multiple cameras is processed to detect object types of interest with, for example, matching template engines operating on multiple scan windows. Image sizes may be modified based on criteria for optimal object detection and for video display that enhances user awareness of surroundings. User cueing may be based on head movements to control selection of images for viewing, panning of images along a wide angle, and changing field of view angles to enlarge portions of a scene, e.g., to provide an enlarged display of a detected object and adjust the position of a selected field of view. Changes in the size and content of displayed peripheral views can be varied based on the speed of user head motions. Image processing functions include: removal of geometric distortion, synthesizing up to a 360° composite field of view based on image acquisition from multiple cameras, and presentation of field of view scans (with variable image resolution) based on head cues measured with an inertial mass unit. The cueing may be based on head movement or eye movement of the user. When sequentially displaying segments of peripheral vision the scan speed is controllable based on user gestures. Image acquisition may be varied with adjustment of programmable camera settings, including an adjustable focus distance, variable depth of field, variable optical field of view angles, camera exposure, ISO speed, aperture settings and selection between visible and infra-red image acquisition.

Depth information may be acquired to determine the distance of a detected object to facilitate object classification and to assist in generating user responses to a threat such as with automated weaponry. In some embodiments image processing functions may be distributed, with hardware-based matching template engines applied in individual camera systems. Resulting object detection information may be provided to a central processing unit to select a field of view angle for display of image information based on object type.

According to a first series of embodiments, a portable system augments vision of surroundings. A helmet permits a user wearing the helmet to receive a first field of view in the surroundings based on optical information received with the user's natural vision directly from the surroundings without digital video processing. A plurality of camera units are mounted about the helmet to generate multiple channels of video data. Each camera channel captures a different field of view of a scene in a region surrounding the helmet. Processing circuitry generates a composite field of view from some of the channels of video data. The cameras may include adjustable settings with the circuitry controlling the camera settings for acquiring the video data. The adjustable settings include optical field of view angles, camera exposure speed and selection between visible and infra-red image acquisition. In one example, the composite field of view subtends a wide field of view angle, and the circuitry displays images of the scene based on selectable field of view angles of the scene, with the images derived from one or more of the channels of video data. Each image subtends a portion of the wide field of view angle. The system may further include a display unit, and the circuitry may include a programmable processing unit in which the circuitry stores the composite field of view in the memory, presents portions of the composite field of view on the display unit, and adjusts scene field of view angles for image presentation on the display unit.

The portable system may be based on cues provided by the user, with the circuitry adjusting display functions, including field of view angles for images of scenes presented on the display unit. The cues provided by the user may be voice commands, based on a touch interface or may be user movements. The user movements may include head gesture movements based on movements of the helmet sensed as time varying velocity or acceleration. The display functions controlled by the user cues may include selecting portions of the scene, selecting a scene field of view angle along a ground plane, selecting an angle of elevation for a scene field of view and presentation of a scan through a composite field of view of the scene on the display.

The first field of view may subtend an angle directly in front of the user's head with the cameras positioned along a surface of the helmet to provide a peripheral view of the surroundings to the left of the first field of view and to provide a peripheral view of the surroundings to the right of the first field of view.

In an advantageous embodiment the system includes a first graphics processing unit and a second graphics processing unit. The first graphics processing unit generates a first segment of the composite field of view based on a second field of view angle subtending a peripheral view of the surroundings to the left of the first field of view, for presentation on a first display unit. The second graphics processing unit generates a second segment of the composite field of view based on a third field of view angle subtending a peripheral view of the surroundings to the right of the first field of view, for presentation on a second display unit. Inertial sensors mounted on the helmet to provide velocity and acceleration information to the processing circuitry and the processing circuitry may perform a combination of functions, including optical image stabilization through controlled movement of lens optics in the camera units; detection and identification of objects by processing of the video data; tracking movements of detected objects; and display of time varying position data representative of movement of a tracked object.

In another advantageous embodiment the system includes sensors providing velocity or acceleration information to the circuitry indicative of changes in walking or running motion of the user, and the circuitry includes a first-processing unit coupled to receive the video data, memory for temporary storage of the video data received by the processing unit, a first display unit and a first graphics processing unit responsive to the first processing unit to store the composite field of view, based on the acquired video data, in the memory, and to provide portions of the composite field of view for presentation on the display unit. Each presented portion of the composite field of view is an image of the scene based on a predetermined or a user-selected field of view and a predetermined or a selected field of view angle subtending a corresponding portion of the scene. The circuitry may apply the velocity or acceleration information to calculate the speed at which the wearer of the helmet walks or runs and the circuitry may change display presentations in response to user speed of movement. In one example embodiment, when motion of the user reaches a threshold speed, the display is automatically modified to present smaller portions of the composite field of view corresponding to smaller field of view angles in the scene, and when motion of the user diminishes below a threshold speed, the system displays the entire composite field of view. If the system includes a second display unit, when motion of the user diminishes below a threshold speed, the system may display the entire composite field of view by presenting a first portion of the composite field of view on the first display and a second portion of the composite field of view on the second display.

According to a second series of embodiments, a method is provided for monitoring a region about the body of a person to provide real time awareness of potential threats. Multiple cameras simultaneously monitor the region while each camera is positioned on the body of the person to optically capture a different field of view of the region in a stream of video frame data. A first portion of the captured streams of video frame data are displayed, based on a first field of view selection, to present an image of a first portion of the region. Periodically, frames of video data in each stream are processed for detection of a potential threat based on a criterion for classifying an object. Displaying may be changed from the first field of view selection to display an image acquired from a different field of view of the region. The first field of view may be automatically selected with programmed circuitry with the image presented of the first portion of the region derived from a composite field of view formed from video frame data captured with two or more of the cameras. However, the first field of view may be selected by the person. The first portion of the region may be a composite field of view derived from two or more of the fields of view captured by the cameras. Display of the image of the first portion of the region may result from an automatic selection of a default field of view.

Display of a first portion of the captured streams of video frame data may include storing portions of the streams of video frame data in a memory device and displaying a composite field of view created from some of the portions of the stored streams of video frame data. A sequence of different composite fields of view may be created and displayed from the stored streams of video frame data, with the composite field of view subtending a field of view angle greater than any field of view angle subtended by any individual field of view from which the composite field of view is derived. Changing selection of the field of view to display images of different portions of the region may create a scan through the composite field of view. Changing from displaying based on the first field of view selection or from the different field of view may be initiated with a head gesture.

In an embodiment of the second series the image of the first portion of the region presented for display subtends a first field of view angle in the region, and the image resulting from changing to the different field of view subtends a second field of view angle smaller than the first field of view angle to present on a display an enlarged image of a portion of the region relative to the image subtending the first field of view angle.

According to a third series of embodiments, a vision system wearable by a user provides enhanced awareness of activities in a scene surrounding the user. The system provides a field of view extending up to 360° about the user. The vision system includes a helmet permitting the user wearing the helmet a direct view of portions of the scene with unaided, natural vision of the user, and optical and electronic components positioned in or about the helmet, including a central processing and control unit 14, multiple cameras positioned along an outside surface of the helmet, sensors providing signals indicative of velocity or acceleration of the helmet, and a pair of displays. Based on image frames derived from the cameras, the central processing and control unit provides images of the scene for presentation on the displays based on programmably adjustable fields of view. This enables simultaneous viewing on the displays of selectable peripheral fields of view corresponding to the left side and to the right side of the user wearing the helmet while the user continues to receive direct views of portions of the scene with natural, unaided vision. In an embodiment the central processing and control unit synthesizes a composite field of view about the wearer of the helmet based on each in a time series of frames of video data generated with each camera. Images of the scene corresponding to the peripheral fields of view are generated from the frames for simultaneous viewing on the displays. The central processing and control unit may selectively present portions of the composite field of view on one of the displays based on cues provided by the user. The central processing and control unit responds to the cues, based on sensor signals indicative of velocity or acceleration of the helmet, by displaying portions of the composite field of view selected by the user.

According to a fourth series of embodiments, a wearable vision system provides a variable field of view to enhance awareness of activities in a surrounding scene. The system includes a helmet permitting a user, while wearing the helmet, a direct view of portions of the scene with unaided, natural vision. The direct view subtends a first field of view angle relative to a center point of the direct view. The vision system also includes a plurality of optical and electronic components positioned in or about the helmet to (i) capture multiple streams of image data with each stream capturing a different view of the scene, (ii) process and generate one or more sequences' images each derived from one or multiple streams of the image data, (iii) alter images in a sequence generated based on user selected changes in scene field of view or scene field of view angle and (iv) provide signals responsive to velocity and acceleration of the helmet which signals are indicative of prespecified head movements made by the user while wearing the helmet. The system may further comprise one or more displays on which the images are presented as a temporal sequence of video data. The prespecified head movements are cues made by the user to select changes in scene field of view or scene field of view angle. The system responds to the cues by generating and presenting a revised image on each of the one or more displays thereby changing from a current field of view to a different field of view selected by the user or changing from a current field of view angle to a different field of view angle selected by the user.

In an embodiment of the fourth series one or more of the user generated cues results in a change in a displayed field of view to present any of a composite field of view of the entire scene on the one or more displays; or a wider field of view of a portion of the scene; or a narrower field of view of a portion of the scene which includes a magnified image of a detected object; or a scan through a field of view angle extending at least between the center point of the direct view and an angle ranging up to 180° from the center point; or a change in image field of view effected by changing from a first angle of elevation to a second angle of elevation.

Also in an embodiment of the fourth series, the components which capture multiple streams of image data include cameras positioned about the helmet to provide a peripheral view of the surroundings to the left of the center point and to provide a peripheral view of the surroundings to the right of the center point and, in response to a head turn by the user of less than 15° to the left or right of the center point, the system presents on a display a peripheral field of view ranging up to 180° to the left or to the right of the 0° center point, or presents a scan extending up to 180° to the left or right of the center point. A user cue may prompt the system to present on a display a peripheral view of a portion of the scene behind the user without requiring turning the head of the user an equivalent angle of rotation required in order to see the peripheral view with the user's unaided, natural vision. In another embodiment of the fourth series, the optical and electronic components detect and identify objects by processing of the image data, tracking movements of detected objects, and displaying time varying position data representative of tracked movement of an object. The vision system may be responsive to a head movement cue to reduce a field of view angle of a displayed image containing a detected object to present to the user an enlarged image of the identified object.

BRIEF DESCRIPTION OF THE FIGURES

These and other features, aspects, and advantages of the present invention will become better understood when the following detailed description is read with reference to the accompanying drawings in which like characters represent like parts throughout, and wherein:

FIG. 1B is a plan view of the helmet incorporating the vision system of FIG. 1A;

FIG. 1C is a plan view of a helmet according to an alternate embodiment of the vision system;

FIG. 5A illustrates a subset of display frames presented during a scan;

FIG. 7A shows a series of window resizings, including a maximum close-up view of a roof-top region;

FIG. 7B further illustrates a display frame window of FIG. 7A;

DETAILED DESCRIPTION OF THE INVENTION

Figure 1A:
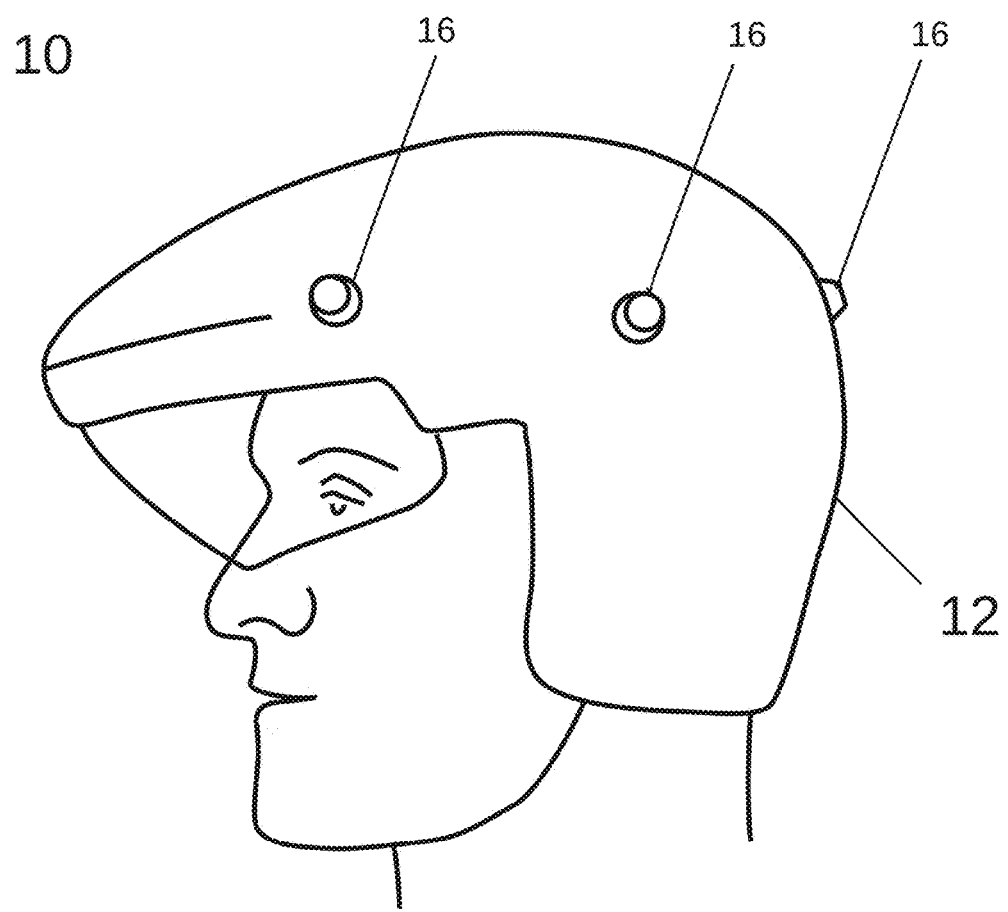
FIG. 1A is a perspective view of a wearable vision system according to an embodiment of the invention with the system formed in a military helmet.

Before describing specific features of exemplary systems and methods relating to the invention, it should be observed that the present invention resides in a novel and non-obvious combination of elements and method steps. So as to not obscure the disclosure with details that will be readily apparent to those skilled in the art, certain conventional elements and steps have been presented with lesser detail, while the drawings and the specification describe in greater detail other elements and steps pertinent to understanding the invention. The disclosed embodiments are exemplary constructions which do not define limits as to structural arrangements or methods according to the invention. The embodiments described are exemplary and permissive rather than mandatory and are illustrative rather than exhaustive.

Features of the present invention may be best understood with brief explanations regarding usage of certain terms. The term 'field of view' is often used in the context of a surface, such as a ground plane commonly present in a field of view over terrain, or any reference plane. The field of view is based on an angle subtended there along through which optical information is received. A field of view may be the view acquired with a single imaging device (e.g., a visible light or infrared focal plane array) or may be based on a composite of views acquired with multiple camera devices positioned to subtend a wide angle field of view up to 360°.

The term 'field of view angle' refers to a particular portion of a total viewing angle, for a single image or for a composite image, through which optical information is received, perhaps with a single image acquisition device or devices. A field of view angle may be a particular portion of a total solid angle along a plane through which optical information is received. A field of view angle may be varied based on a selected position of an optical axis or plural optical axes along the plane. Two lens imaging systems, each having identical characteristics and settings, including the same field of view angle through which optical information is received, may provide two different fields of view based on differences in position or orientation of the optical axis of each.

A stream of video data is a temporal sequence of video data such as data frames. When a specific field of view is acquired by a user of the disclosed vision system without aid of a camera or other electronic image acquisition device, this process is referred to as natural vision.

Systems and methods are described for enhanced viewing of a scene and for classifying objects. An object may be a person undertaking predefined activities or carrying predefined types of gear. Although specific details are set forth, embodiments of the invention may be practiced without these specific details. Reference to an embodiment means that a particular feature, structure, or characteristic described in connection with the embodiment is included in at least one embodiment of the present invention. Multiple occurrences of phrases like "in one embodiment" or "in an embodiment" does not necessarily refer to the same embodiment. The particular features, structures, or characteristics may be combined in any suitable manner in one or more embodiments. Embodiments of the invention are applicable in a variety of settings in which it is desired to detect specific features in digital images.

There is continued need to improve the safety and success of those in harm's way, especially for ground forces, first responders at disaster scenes and personnel responsible for monitoring terrorist activities. There is a demand to improve real-time situational awareness for militia exposed to dynamic and unpredictable changes to enable fast reactions which quickly mitigate losses.

While the invention may be applied to a wide array of applications to provide enhanced awareness of activities surrounding a user, embodiments are described in a context useful for improving awareness of adversarial activities. In example applications, multiple cameras in a vision system simultaneously capture fields of view surrounding a user of the vision system to collectively provide image data over an entire scene in a region. In one example, the vision system describes a trail of object movement to enhance awareness of changes in object position which may pose a threat.

According to certain embodiments, a vision system 10 is worn by a user to provide enhanced awareness of activities, with the surrounding field of view extending up to 360°. With reference to FIGS. 1A, 1B, 2A and 2B, the vision system 10 is integrally formed with a military helmet 12. It includes a central processing and control unit 14, multiple cameras 16 positioned along an outside surface of the helmet, and a pair of displays 18. The cameras 16 may have fixed focus lenses or may have adjustable lens optics to provide variable field of view settings. Collectively the cameras provide a programmably adjustable composite field of view about the wearer of the helmet. Image frames derived from the cameras are transmitted through the central processing and control unit 14 to the displays 18 which provide left-hand and right-hand peripheral fields of view corresponding to left and right sides of the wearer.

The exemplary vision system 10 provides object detection with scan windows as described in co-pending U.S. patent application Ser. No. 15/591,321 which describes performing object detection with processors each dedicated to a camera unit to achieve frame rates on the order of 30 fps when processing data to detect a large number of object classes. The vision system 10 also optically or digitally changes the fields of view received from individual cameras in order to display enlarged views of objects and analyze details to better classify images according to object types. The vision system effects optical image stabilization by imparting controlled movement of each camera lens or image array (e.g., to remove jitter). The controlled movement to effect optical image stabilization may be responsive to conventional measurement of time varying velocity or acceleration with an inertial mass unit. Geometric distortion corrections are applied to remove "fisheye" effects due to wide angle lenses.

A feature of illustrated embodiments is real-time scaling of fields-of-view in response to predetermined criteria or user initiated cueing. The vision system 10 also creates composite images in video memory. Portions of composite images, perhaps subtending 50° field of view angles, are selectively displayed. Use selection of the image portions for immediate display may be based on head movements interpretated as cues by instrumenting the helmet 12 with detectors.

The helmet 12 as illustrated in FIGS. 1A and 1B includes five cameras 16, each having adjustable optics to provide a variable field of view. In a default mode the cameras 16 each subtend an 80° field of view angle to capture fields which overlap by 4°. Collectively, these views enable continuous monitoring of the entire 360° field of view about the helmet 12. Generally, for embodiments having two or more cameras, the central processing and control unit 14 applies panoramic imaging techniques to assemble portions of image frames from adjoining cameras 16 for sequential presentation of image frames subtending selected fields of view on each display 18. According to an embodiment of the invention, camera settings are individually adjustable, and exposure settings of cameras having fields of view facing brighter light (e.g., sunlight) are higher than the exposure settings of cameras for which the fields of view face lower light levels, e.g., mostly shaded or shadow regions.

In a first alternate embodiment, the vision system helmet includes two fixed focus cameras, each having a field of view angle of at least 180°. Each camera is positioned to capture a peripheral view of the surroundings on an opposite side of the helmet 12. In a second alternate embodiment, in a partial view shown in FIG. 1C, a vision system helmet 12' has three cameras $16_1$, $16_2$ and $16_3$, each having a fixed field of view angle of at least 120°. The cameras $16_1$, $16_2$ are positioned to capture a peripheral view of the surroundings on an opposite sides of the helmet 12', and the third camera $16_3$ is positioned to acquire a rear view image of the surroundings from behind the helmet 12'.

Cameras in the first alternate embodiment may each provide a view somewhat larger than 180° to provide a modest overlap between fields of view that assures continuity in a full 360° composite view of the surroundings. For similar reasons, cameras in the second alternate embodiment (FIG. 1C) may each provide a view somewhat larger than 120° to assure overlap of the three fields of view.

Referring again to the embodiment shown in FIGS. 1A and 1B, the helmet 12 permits the user, while wearing the helmet, a direct view of portions of the scene with unaided, natural vision of the user. Thus the direct view subtends a first field of view angle relative to a center position, referred to as 0°, of the direct view. The helmet includes a left hand display 18L, placed to the left of the center position (i.e., 0°) which is the position along which the wearer's face is directed when the helmet is worn. Similarly, a right-hand display 18R is placed to the right of the 0° center position. The exemplary displays 18 incorporate a flexible screen technology, such as used in camera phones, and which can be manually moved into or out of the wearer's visual field. They may be operable with hinge-like mechanisms by which each display is rotated down for use or rotated up for non-use. For energy savings and convenience the system 10 is powered on and turned off via switches controlled according to a rotated position of each display 18. The vision system 10 is activated when either of the displays 18 is rotated downward into a position for camera vision and is deactivated when both displays 18 are rotated to non-use positions.

During use of the helmet 12 without activation of the vision system 10, the wearer has a relatively unobstructed view of a region extending nearly 90° to the left of the 0° center position and nearly 90° to the right of the 0° center position. The unobstructed view, which may extend to an elevation angle about 60° above the ground plane, is referred to as the user's visual field of view because it is a view naturally acquired with the direct vision of the wearer of the helmet, i.e., without aid of a camera. The display 18L provides a variable left-side peripheral vision and the display 18R provides a variable right-side peripheral vision. The two peripheral vision displays 18L, 18R are each positioned in an upper portion of the helmet wearer's visual field of view to avoid undue obstruction of the user's visual field. The displays 18 may be positioned along or near other portions of the visual field of view.

Figure 2A:
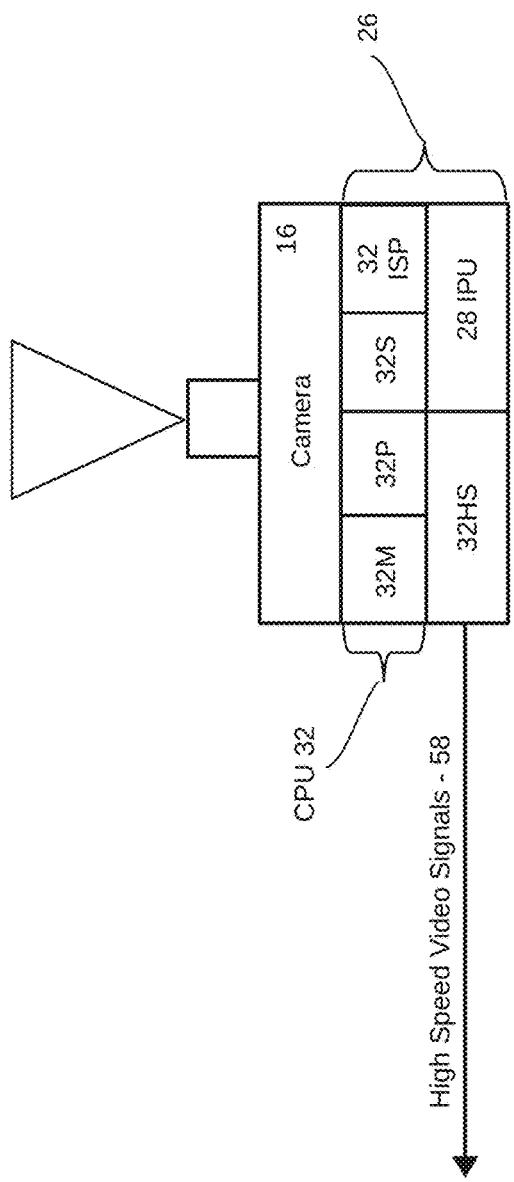
FIG. 2A is a block diagram illustrating components in the vision system of FIG. 1A.
Figure 2B:
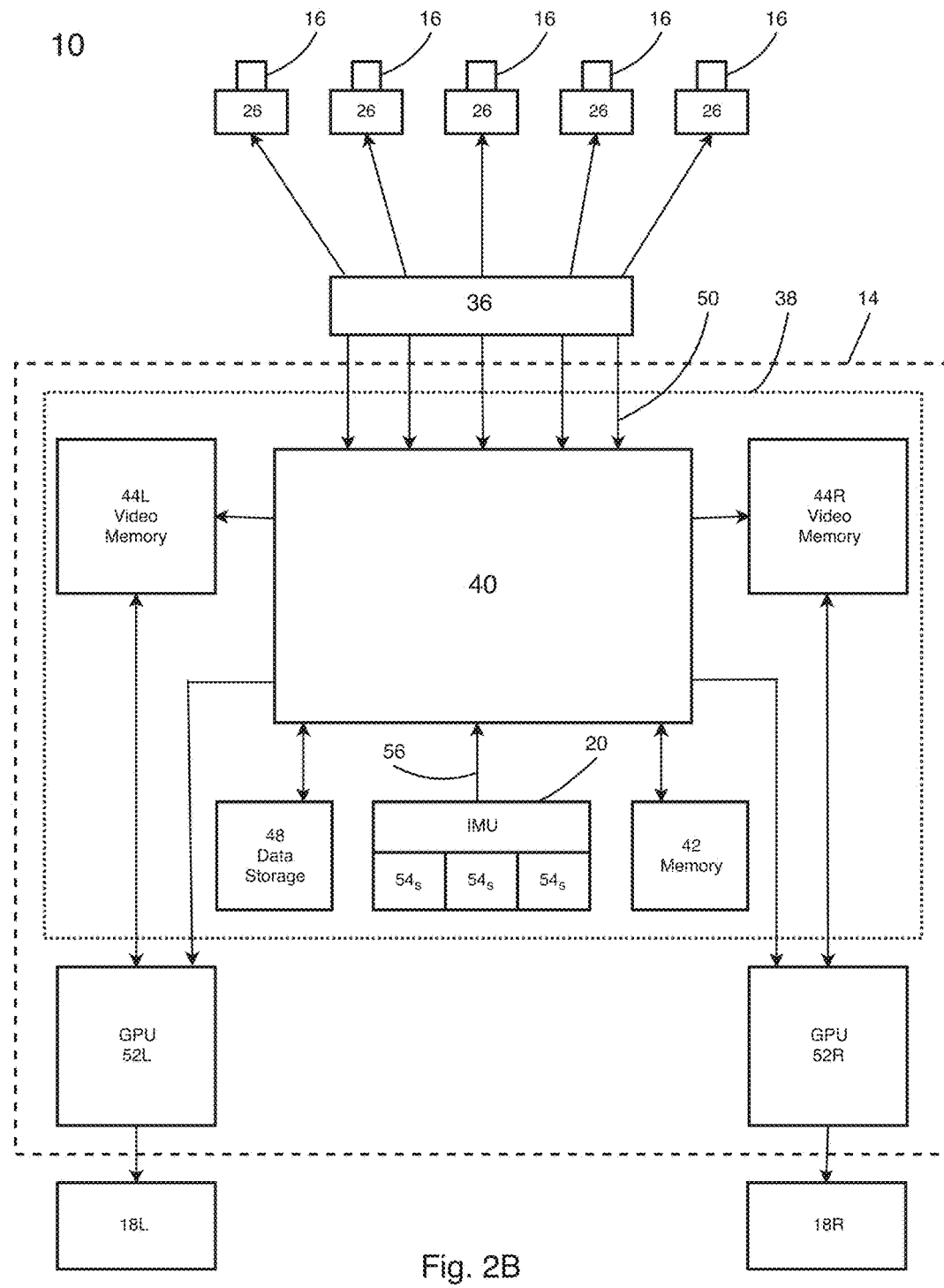
FIG. 2B illustrates a processor-based imaging module comprising a camera and image frame processing electronics.

Referring to FIG. 2A, each camera 16 is part of a processor-based imaging module 24 which includes image frame processing electronics 26. The image frame processing electronics 26 provided for each camera 16 includes an Image Processing Unit (IPU) 28 connected to receive the raw camera image data (which may be Bayer pattern image data), a Computer Processing Unit (CPU) 32 and a high speed data communications interface 32HS. The CPU 32 controls camera settings and data communications with the central processing and control unit 14. The CPU 32 includes a programmable processor 32P, an image signal processor 32ISP, memory 32M and storage 32S. Memory 32M may be a multi-port device accessed by the IPU 28, the CPU 32 and the image signal processor 32ISP.

The imaging modules 24 perform dedicated processing functions and apply decision criteria to rapidly change camera settings based on determinations made with the image frame processing electronics 26, including object detections. The processing electronics 26 also receives commands from the central processing and control unit 14 to change camera settings. Optical image stabilization (OIS) and electronic image stabilization (EIS) are also effected in each module 24 with the image frame processing electronics 26 to limit uncontrolled movements of displayed images. This mitigates jumping about of images on a display when the wearer is running or moving abruptly. The image frame processing electronics 26 also corrects for wide angle geometric distortions. U.S. Pat. No. 9,280,810, incorporated herein by reference, discloses core functions which, in addition to correcting for geometric distortion, provide correction for camera shake, user defined distortion and lens-sensor misalignment. Application of a geometric distortion engine to the image frames generated by each camera 16 enables the central processing and control unit 14 to generate wide angle images based on narrower and variable fields-of-view from each camera. Portions of corrected frames derived from different modules 24 can be readily combined by the central processing and control unit 14 to form undistorted composite fields of view.

The processing electronics 26 performs object detection and classification according to predefined object types. See U.S. Pat. No. 8,995,715 "Face or Other Object Detection Including Template Matching" incorporated herein by reference. When an object of potential interest is detected, the image frame processing electronics 26 may, based on predefined criteria, change the camera field of view to acquire an optically enlarged image of the object (i) to improve accuracy of classification among predefined object types or (ii) for presentation on a display 14.

The central processing and control unit 14 includes a multi-channel two-directional data transmission interface 36 which receives parallel streams of video data from all of the imaging modules 24 via high speed data lines 50. Frames of the video data are received into a central processing unit (CPU) 38 comprising a processor 40, microprocessor memory 42, video memory 44L, video memory 44R and data storage 48 containing data and executable software which runs on the processor 40. The CPU 38 stores frames of video data to be processed for presentation on display 18L in video memory 44L and stores frames of video data to be processed for presentation on display 18R in video memory 44R. The system 10 includes a first dedicated graphics processing unit (GPU) 52L, and a second GPU 52R, each under the control of the CPU 38 for generating the frames of processed image data presented on the displays 18L and 18R, respectively.

In other embodiments, functions of the image frame processing electronics 26 provided in each processor-based imaging module 24 (e.g., performed by any of the processors 32P and 32ISP or the IPU 28) may be integrated into the central processing and control unit 14, or otherwise consolidated for all cameras 16, to provide support functions and processing such as to control optical settings or perform object detection and classification; and these functions may otherwise be shared among the multiple cameras 16.

The central processing and control unit 14 includes an Inertial Mass Unit (IMU) 54 comprising inertial sensors 54S which provide time varying signals 56 indicative of angular velocity and linear acceleration in response to movement of the helmet 12. The IMU sensors 54S may be three groups of accelerometers and gyroscopes that measure forces experienced by the helmet and measure angular velocity of the helmet. The CPU 38 receives the IMU signals 56 as well as object identification and time varying position data for objects of potential interest from the imaging modules 24. The IMU signals 56 are processed for optical image stabilization and sensing head movements of the user wearing the helmet 12. In embodiments based on optical image stabilization, the processor 40 provides each processor-based imaging module 24 appropriate displacement information for the module to impart controlled counter movement of each camera lens or imaging array to effect optical image stabilization. Other embodiments may perform Electronic Image Stabilization (EIS) in the central processing and control unit 14 to counter the movement. The IMU signals 56S are used to facilitate image stabilization when tracking an object in, for example, a composite field of view.

The CPU 38 receives data from the imaging modules and sends control signals to the imaging modules 24 via the high speed data lines 50 and the data transmission interface 36. Either of the CPUs 32 and 38 may initiate generation of enlarged images for presentation of the detected objects on the displays 18L and 18R. Specifically, when object detection and classification is performed in the imaging modules 24, the CPUs 32 can optically adjust the field of view angle for optimal resolution and classification of small features of interest. This is particularly useful when a classifier identifies and distinguishes a person carrying a weapon, or distinguishes between a weapon carry position and a firing position. Based on cues generated by the user, the CPU 38 also provides control signals to the camera modules 24 to modify camera settings such as field of view angles, camera speed and switching between visible and infra-red image acquisition. The CPU 38 also provides control signals to the GPUs 52L, 52R to select fields of view for presentation on the displays 18L and 18R and to select or modify field of view angles for displayed images. The vision system 10 provides both programmed and user-controlled views for presentation on the displays 18L and 18R. Changes in views are based on, for example, cues provided by the user, or detection and classification of an object type, or detected activities of a classified object. Examples include movements classified as being associated with activities of a possible sniper or a brief reflection of light which is classified as possibly coming from a gun scope lens as a precursor to rifle firing. With regard to cues provided by the wearer of the helmet 12, the user may control display functions based on voice commands, a touch interface or wearer movements, such as monitored head gestures sensed as helmet movements by the IMU 54. With the IMU 54 mounted to the helmet 12, some of the IMU signals 56 generated in response to movement of the helmet 12 may be indicative of changes in linear motion (e.g., transitions from walking to running). Other IMU signals correlate with predefined head movement gestures made by the helmet wearer as cues to control selection of views presented on the displays 18.

FIG. 3 illustrates an exemplary series of head movement cues or gestures, described in terms of pitch, yaw and roll movements about a center point of the helmet wearer's head. The IMU 54 senses the cues based on corresponding movements of the helmet 12 and reports these to the processor 40 as changes in pitch, yaw and roll. Head lean right and head lean left are opposite changes in angle of roll rotation. Head turn left and head turn right are opposite changes in angle of yaw rotation. Head lean forward and head lean backward are opposite changes in angle of pitch rotation. In all of the drawings, left and right directions are referred to with respect to the perspective of the wearer of the helmet, rather than that of an observer of the helmet 12.

In response to the type and magnitude of IMU signals 56 received, the microprocessor 40 sends appropriate control signals to the GPUs 52L, 52R to change the selection of views on one or both of the displays 18, or to change the scan parameters or other display functions. FIGS. 4, 5 and 6 illustrate wide angle scenes on the left side and/or the right side of the helmet 12, as synthesized by the GPUs 52L or 52R and held in video memory 44L or 44R. These are composites of smaller fields of view acquired with the five imaging modules 24 to provide two full 180° peripheral camera vision fields of view. The figures illustrate a few representative image frames which are portions of each full peripheral camera vision field of view available for selective presentation on the displays 18R and 18L. Referred to as display frames 58, these image frames are each part of a larger sequence of image frames generated for presentation on a display 18L or 18R during a scan through a peripheral camera vision field of view. The two sequences provide the wearer of the helmet with display frames 58 covering peripheral camera vision 180° to the left and 180° to the right of the center position 0°.

Figure 4A:
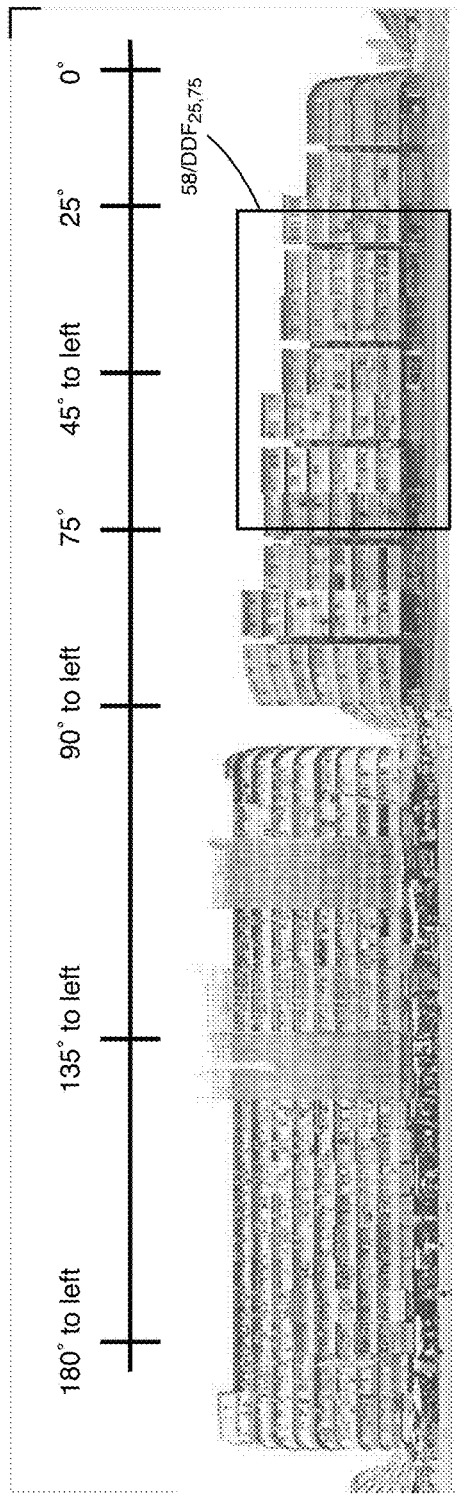
FIG. 4A illustrates a wide angle camera vision scene to the left of the helmet shown in FIG. 1A.
Figure 4B:
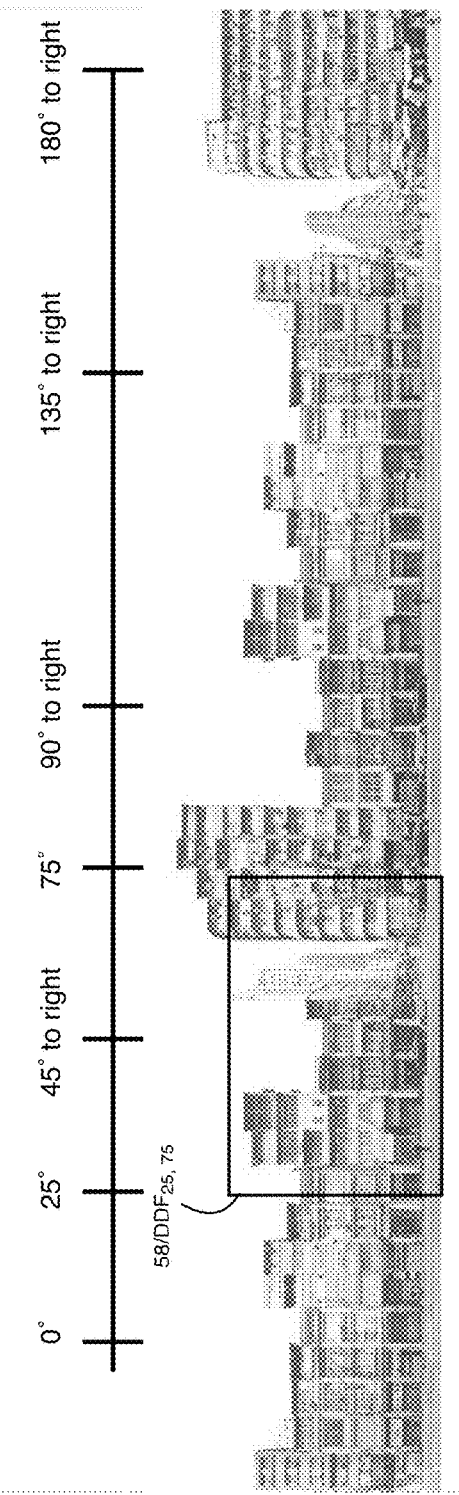
FIG. 4B illustrates a wide angle camera vision scene to the right of the helmet shown in FIG. 1A.

In the example application, for each display 18L and 18R the vision system 10 generates as one of the display frames 58 a Default Display Frame, DDF, based on a default peripheral camera vision field of view angle centered at a default position relative to the 0° center position shown in FIGS. 1B and 1n the composite fields of view shown in FIGS. 4 through 6. The peripheral camera vision field of view for each Default Display Frame, DDF, subtends an exemplary 50° angle in the composite 180° field of view angle synthesized by each GPU 52L and 52R. As shown in FIGS. 4A and 4B, the 50° field of view subtended by each Default Display Frame extends through an exemplary range beginning 25° from the 0° center position and to a position 75° from the center position. Default Display Frames, DDF, shown in FIGS. 4A and 4B occupy stationary positions in the 180° peripheral camera vision field of view angle synthesized by each GPU 52L, 52R. Accordingly, the Default Display Frames DDF are annotated $DDF_{25,75}$ to indicate the exemplary 50° range extends from the 25° position to the 75° position.

When a Default Display Frame $DDF_{25,75}$ is being presented on one of the displays 18L or 18R, so long as the processor 40 does not receive signals from the IMU or the imaging modules 24 which prompt the vision system to change the presentation, the display continues indefinitely to present the Default Display Frame $DDF_{25,75}$. Also, in those instances where the vision system 10 has changed one of the display presentations (e.g., to present a close-up view or to scan through a field of view angle), the processor 40 is programmed to return the display to the Default Display Frames $DDF_{25,75}$ after a predetermined period of time.

Responsive to changes in speed of travel of the helmet user, the processor 40 directs the GPUs 52L and 52R to change selection of field of view angles or otherwise alter presentation of the display frames 58 derived from the left-hand and right-hand composite camera vision fields of peripheral view. The processor 40 receives the signals 56 from the IMU 54 from which the speed at which the wearer of the helmet walks or runs is estimated. When the wearer stands still or walks at a slow pace, e.g., less than a threshold speed of 5 mph (8 kph), the processed IMU signals do not, based on speed, prompt a change in display presentations from the Default Display Frames $DDF_{25,75}$. When the speed of the wearer of the helmet 12 reaches the threshold speed, smaller portions of the camera vision fields of peripheral view are selected to generate the display frames 58. For example, the displayed field of view angle may diminish from 50° to 40°. Each time processor computations, based on IMU signals, indicate the wearer speed has increased further above the threshold speed by a predefined incremental rate, the displayed portions of the peripheral camera vision fields of view become incrementally smaller. This results in display of a more magnified peripheral camera vision adjoining or overlapping with the frontal natural vision of the helmet user. When the speed of the user slows down, the displayed camera vision fields of view are altered to subtend larger angles. At a predetermined time after the speed of the helmet wearer drops below the threshold speed, the displays 18 may resume presentation of the Default Display Frames $DDF_{25,75}$, allowing the wearer to immediately scan the relatively larger 50° portions of the peripheral camera vision fields of view.

In another embodiment, when the helmet wearer ceases movement at rates above the threshold speed, instead of reverting to presentation of the Default Display Frames $DDF_{25,75}$, the system generates a first enhancement mode in which the full 180° wide angle views of both camera vision peripheral fields are presented in a compressed form on the displays 18. By glancing at the displays 18L and 18R, the entire 360° scene illustrated in FIGS. 4A and 4B is viewable in a compressed form. This provides the wearer a comprehensive view of the entire surroundings to visually detect any significant motions or events. If the wearer identifies an activity of interest, head cues may be used to shift either or both of the display presentations to scan through enlarged 50° fields of view.

Figure 3A:
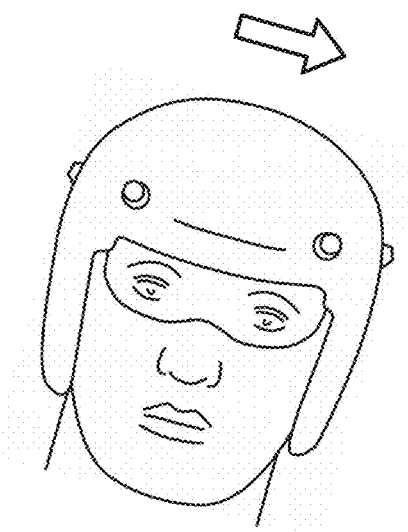
FIGS. 3A-3G illustrate a series of head movement cues for control of the vision system.
Figure 3B:
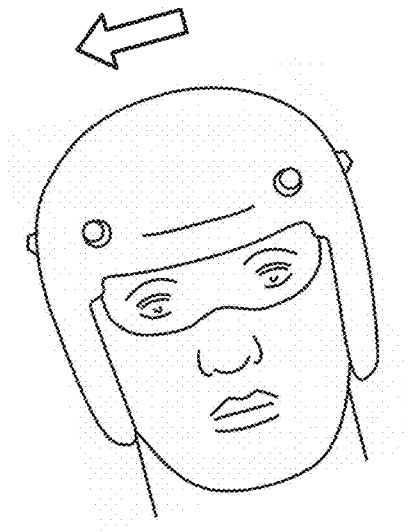
Figure 3C:
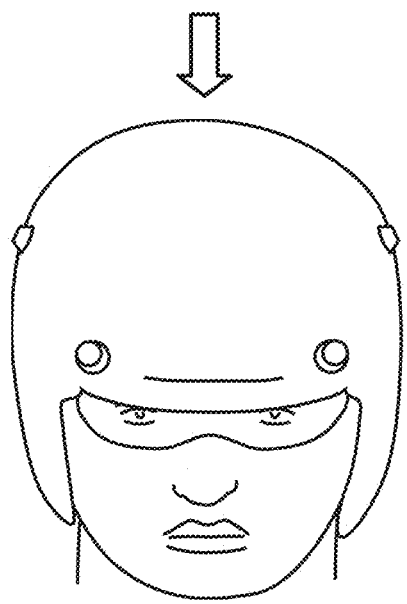
Figure 3D:
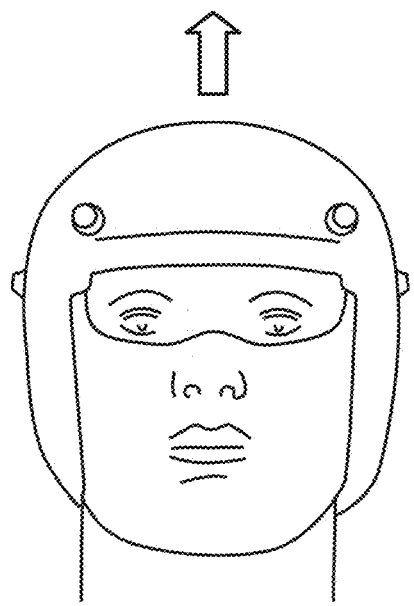
Figure 3E:
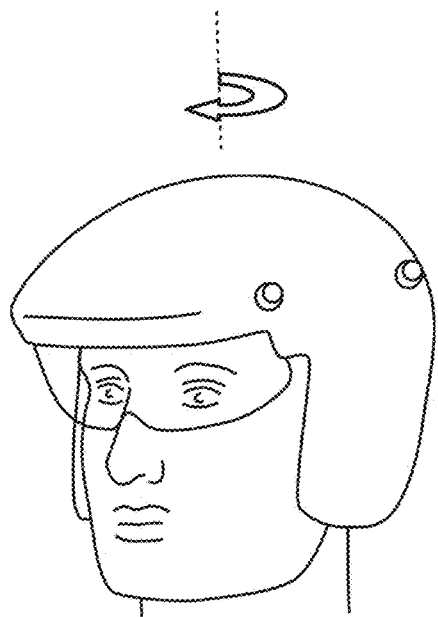

That is, in addition to providing the first enhancement mode, in which a full view of the surroundings is displayed when the user's rate of travel falls below the threshold speed, the user may next select a second enhancement mode to initiate a higher resolution scan of one or both peripheral camera vision regions. This mode is initiated when the head of the user is turned in directions as illustrated in FIGS. 3D and 3E. When the left head rotation is sensed by the IMU 54, the processor 40 sends control signals to the GPU 52L, and when the right head rotation motion is sensed by the IMU 54, the processor 40 sends control signals to the GPU 52R. In response to the control signals generated by these head turns, the GPUs reduce the field of view angle from of that of the corresponding compressed 180° display to the default 50° field of view angle. By repeating the same cues, views presented on the displays become even more magnified. With the vision system operating in this second enhancement mode, a turn of the head by a small amount, e.g., ten to fifteen degrees initiates a scan through the entire 180° field at the current magnified field of view angle. A head turn to the left prompts the scan through the left camera vision peripheral field of view and a head turn to the right prompts the scan through the right camera vision peripheral field of view.

In addition to being faster than the time it would take to rotate the user's body through 180° to see the same view with natural vision, the ten to fifteen degree head turn movement that initiates this scan through the camera vision can be so subtle as to avoid alerting an enemy stalking the wearer of the helmet 12 that the user has detected the presence of the stalker. Methods for implementing the series of cues in this second enhancement mode will be apparent from the following descriptions of first, second and third sequences of head movement cues. Visual cues described for each sequence are available in all scan modes.

Figure 5B:
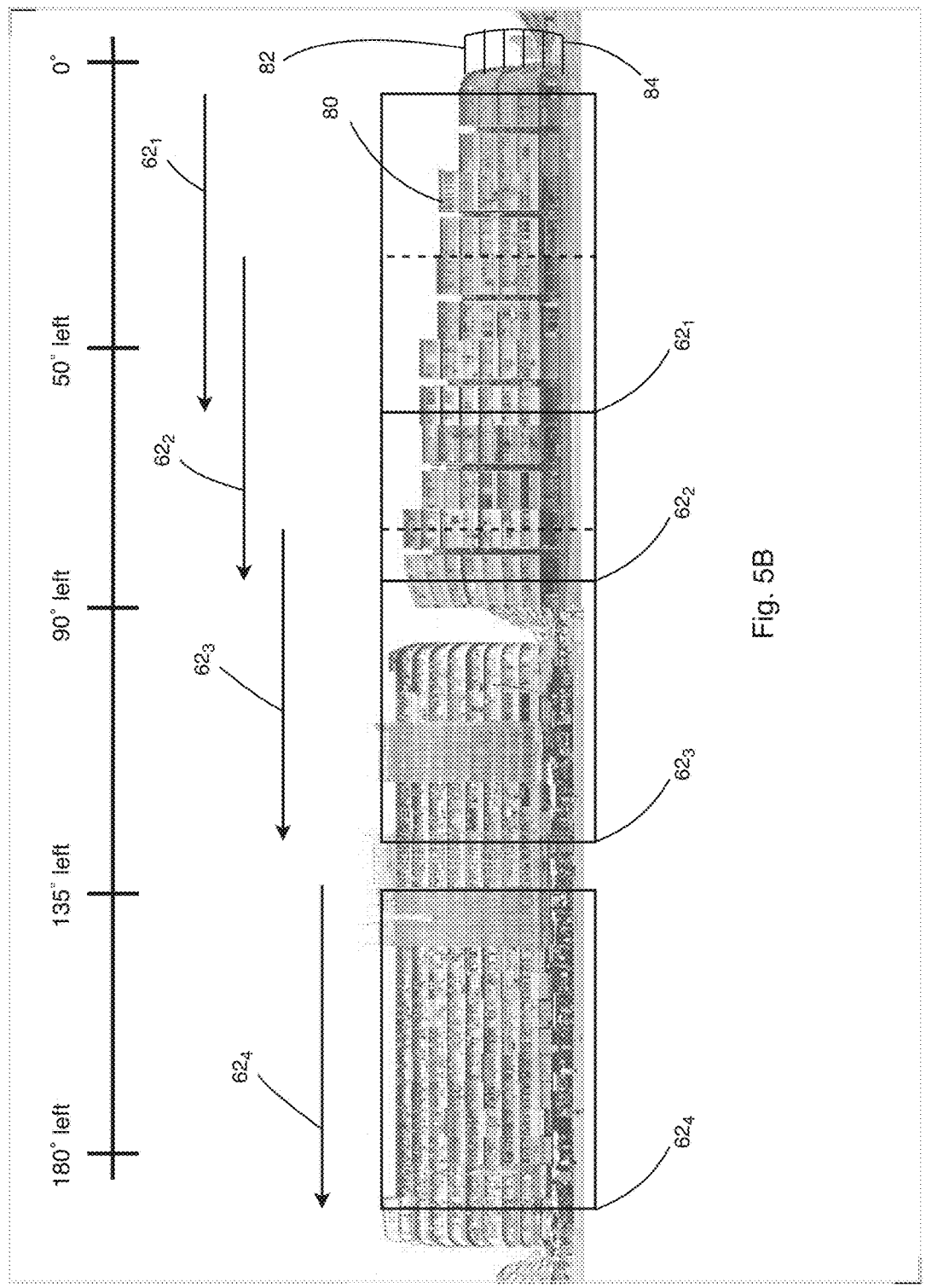
FIG. 5B illustrates another subset of display frames presented during a scan.
Figure 6:
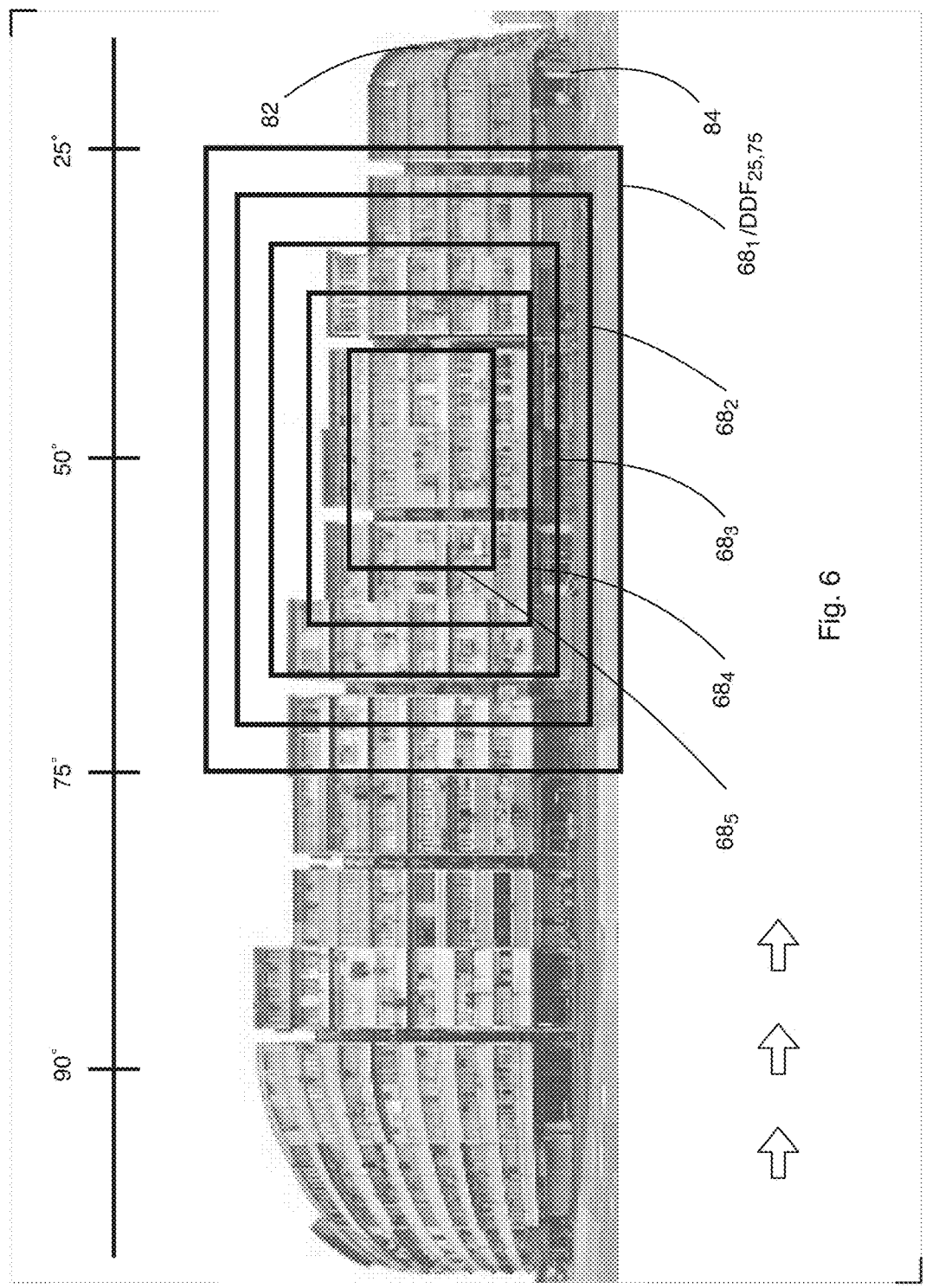
FIG. 6 provides a partial view of the composite camera vision scene shown in FIG. 4A.

FIGS. 5A and 5B illustrate exemplary scans through the composite peripheral camera vision field of view on the left side of the user for the scene shown in FIG. 4A. FIG. 5 each illustrate a small subset of members in a set $62_i$ or $64_i$ of display frames 58 which appear on the display 18L during scans through fields of view. Members in the set $62_i$ (i=1 to n) of scanned display frames 58 are sequentially presented on display 18L during the relatively slow, continuous scan through a portion of the full 180° peripheral camera vision field of view. Members in the set $64_i$ (i=1 to k) of scanned display frames 58 are sequentially presented on display 18L during the more rapid scan through the entire 180° peripheral camera vision field of view. Although not shown, analogous subsets of display frames can be presented on the display 18R.

The scan operations described with reference to FIGS. 5A and 5B are controlled, respectively, with a first sequence 66A or a second sequence 66B of head movement cues based on the exemplary head gestures shown in FIG. 3. The sequences 66A and 66B each control scan speed and other parameters. In one embodiment scan speeds are based on magnitudes of helmet accelerations sensed with the IMU 54 and attributable to head movement cues illustrated in FIG. 3. The microprocessor 40 initiates a slow scan speed in response to a relatively slow, gentle head movement, which does not exceed a first preset threshold magnitude of acceleration. The microprocessor 40 initiates a more rapid scan speed in response to a quick, abrupt movement (e.g., a head flick) which exceeds the first preset threshold magnitude of acceleration. Advantageously, the user-provided cues can initiate scans through large angles of a peripheral field of view beginning with a currently displayed field of view, e.g., default display frame $DDF_{25,75}$.

The user cue in sequence 66A, for initiating the slow scan of FIG. 5A, starts the scan at 75° to the left of the center point with a small, gentle flick of the head by 10° to 15°. This corresponds to the Lean Left Roll movement indicated in FIG. 3A which does not exceed the first preset threshold magnitude of acceleration. The slow scan may extend through 180° left of the 0° center point. With this camera vision feature the user is able to "look" behind without turning the head an equivalent angle of rotation. If this relatively small angle rotation is performed while an adversary is looking at the user, the adversary may be less likely to become aware that the user is "looking" rearward with the camera vision.

The more rapid scan of FIG. 5B is initiated with an abrupt movement of the head by 10° to 15°, which movement exceeds the threshold magnitude of acceleration. The rapid scan of FIG. 5B is also made with the Lean Left Roll movement indicated in FIG. 3A.

Figure 3F:
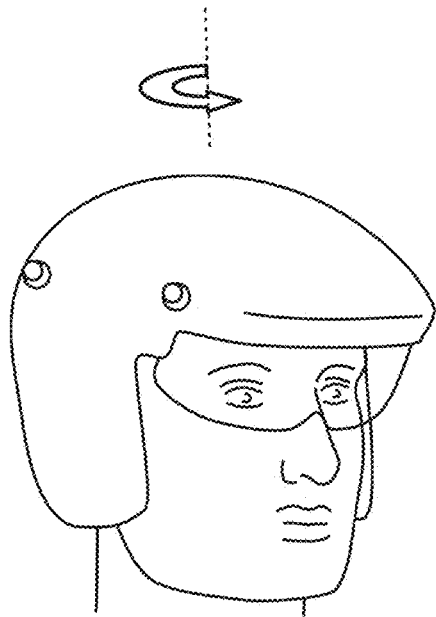
Figure 3G:
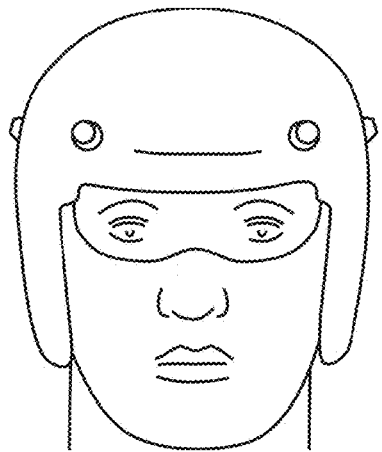

In the relatively slow speed scan of the display frames $62_i$ of FIG. 5A, the scan may be halted any time before reaching the full 180° range. After the helmet wearer initiates the slow scan with the first cue in the sequence 66A of head movement cues, the display changes from presentation of the default display frame position $DDF_{25,75}$ to initiation of the partial or full scan of the peripheral camera vision field of view in the direction toward the 180° point. Once this slow scan begins, the wearer of the helmet may gently resume a more erect head position as shown in FIG. 3G without affecting the scan. The scan continues unless the helmet wearer halts the scan by presenting, as a second cue in the sequence 66A, another change in head orientation. For example, the user's second cue may be a combination consisting of the Lean Left Roll movement indicated in FIG. 3A in the sequence 66A, followed by an abrupt change to the upright head position in accord with FIG. 3G where the abrupt change exceeds a second preset threshold magnitude of acceleration measured by the IMU 54. In this example, at the time the partial scan stops, the frame $62_4$ is being presented on the display 18L and this view continues to be presented until the wearer provides a third in the sequence 66A of head movement cues, such as shaking of the head from left to right as shown in FIGS. 3E and 3F, which combination of head movements prompts the GPU 52L to reset the display to the position of the default display frame $DDF_{25,75}$. In other implementations, when the wearer of the helmet presents a different second cue, a reverse scan is initiated, returning slowly to the position of the default display frame $DDF_{25,75}$. At any time during the reverse scan the wearer of the helmet may re-initiate a slow, partial scan toward the 180° position with the first cue in the sequence 66A, or may stop the scan, with the abrupt head movement cue of FIG. 3G, to observe real time activity in a particular field of view. Cues may be based on a combination of the head gestures shown in FIG. 3 or other body movements.

With the set of display frames $64_i$ of FIG. 5B scanned at a higher speed than the display frames described for the example of FIG. 5A, the scan range automatically covers the full 180° left peripheral camera vision field of view. The helmet wearer initiates the more rapid scan with a first cue in the sequence 66B of head movement cues which, like the first cue for initiating the scan of FIG. 5A, is a tilt of the head to the left as shown in FIG. 3A. However, when compared to the first cue for initiating the scan of FIG. 5A, the cue initiating the first scan of FIG. 5B is a more sudden and sharp movement, i.e., a more abrupt tilt to the left, which exceeds the first preset threshold magnitude of acceleration as measured by an IMU accelerometer. Through use of the vision system 10 the wearer can learn to apply the requisite force to effect the threshold accelerometer magnitude. The vision system may also be programmable to set a customizable threshold accelerometer magnitude to meet preferences of the wearer.

In response to the first head gesture cue in the second sequence 66B of head movement cues, the display changes from presenting the default display frame $DDF_{25,75}$ to presentation of the more rapid scan of the peripheral camera vision field of view. The scan begins at the position $64_1$ of the default display frame $DDF_{25,75}$ and runs to 180° left of the 0° center point. Once this more rapid scan begins, the wearer of the helmet may resume a more erect head position as shown in FIG. 3G without affecting the scan sequence. When the initial scan reaches the 180° point, a reverse scan is automatically initiated, returning slowly through the peripheral camera vision field of view to the position of the default display frame $DDF_{25,75}$. While the reverse scan is proceeding, the wearer of the helmet may provide a second head gesture in the sequence 66B of head movement cues to stop the reverse scan, or to back up and review a lapsed portion of the reverse scan.

Instead of displaying continuous scans as described in conjunction with FIG. 5, according other embodiments, cues can initiate scans through sequences of discrete fields of view to present the user with displays of incremental shifts in fields of view along the peripheral view. The shifts could be in increments of 30° or 50° extending away from the 0° center point. Discrete views in the sequence may be presented for one or several seconds before the system displays a next view in the sequence, or the discrete views can be presented for longer fixed periods, subject to additional cues which each prompt the vision system 10 to present the next view.

In other embodiments object detections and classifications also serve as cues by which the vision system 10 changes views presented on the displays 18L and 18R. The system alerts the wearer of the helmet to potential dangers by automatically displaying detected objects known to have associations with high-risk events. In one example, the vision system 10 displays a rooftop path followed by a person who may be a sniper moving into a firing position. The automatic display may be prompted by a combination of identifying presence of a person along an upper edge of a building, detection of a weapon being held by the person and the tracking of movement by the person along the rooftop. Another element in a possible combination of identifications and classifications is the sudden, brief occurrence of glare or reflected light from the rooftop location that correlates with sunlight which may have been reflected from a rifle scope.

FIG. 6 provides a partial view of the 180° composite camera vision scene shown in FIG. 4A. The view extends between the 0° center point and a point 135° to the left of the user. Initially the display presents the Default Display Frame $DDF_{25,75}$ subtending the default 50° field of view angle. The vision system 10 operates in a resize mode to adjust sizes of images displayed by varying camera optics or by digitally varying displayed field of view angles. Selectable portions of this partial peripheral field of view are displayed in a series of sequentially smaller field of view angles presented as resized frames on a display. The figure illustrates a series 68; (i=1 to 5) of resized display frame windows. This subset of display frames 58 generated by the GPU 52L sequentially provides larger magnifications of image portions of interest present within the Default Display Frame $DDF_{25,75}$. In another example, reduced field of view angles of display frames within another series $70_i$ of resized display frame windows provide progressively larger close-up views of a rooftop region 80. The user reduces the field of view angles to better visualize activities of a sniper 74 in a maximum close-up view of a rooftop region 80 presented in display frame window $70_5$ of FIG. 7A. Each of these exemplary series of window resizings extends from the default 50° field of view angle, identified as display frame window $68_1$ or $70_1$, through progressively smaller field of view angles, to the smallest of the resized display frame window $68_5$ or $70_5$ which subtends a field of view angle less than 25°.

The user operates the vision system in the resize mode with a third sequence 76 of head movement cues to control both presentation size (based on field of view angle) and elevation. The resize mode cues are sensed by the IMU 54, but in other embodiments this mode may also be operated with other means, including voice activation or touch interface cues. An exemplary first cue in the third sequence 76 of head gestures is (i) a tilt by which the head leans forward and downward (i.e., the downward change in pitch shown in FIG. 3C) to perform a digital zoom-in of the display window or (ii) a tilt by which the head leans back and upward (i.e., the Upward change in pitch shown in FIG. 3D) to perform a digital zoom-out of the display frame 58 toward or beyond the 50° field of view. A second head gesture cue in the third sequence 76 of head movement cues is an elevation control cue which moves the zoomed-in display frame 58 up or down, e.g., to center on one of several roof-top regions 80 having different elevations, a balcony on one of several apartment levels 82, or the street level 84. The display frame window 70$_5$, having the narrowest field of view angle in the series 70$_i$, is shown adjusted in elevation to be centered on a roof-top region 80. Elevation control with a second head gesture cue in the third sequence 76, may comprise repetitive rocking in the form of the downward and upward head nod pitch movements shown in FIGS. 3C and 3D to adjust the elevation in an upward direction with respect to the ground plane; or repetitive right/left head turn yaw movements shown in FIGS. 3E and 3F to adjust the elevation downward toward the ground plane. The elevation control cues may be further distinguished over the re-size mode cues by being relatively slower than the typical speed of head nodding.

Figure 8:
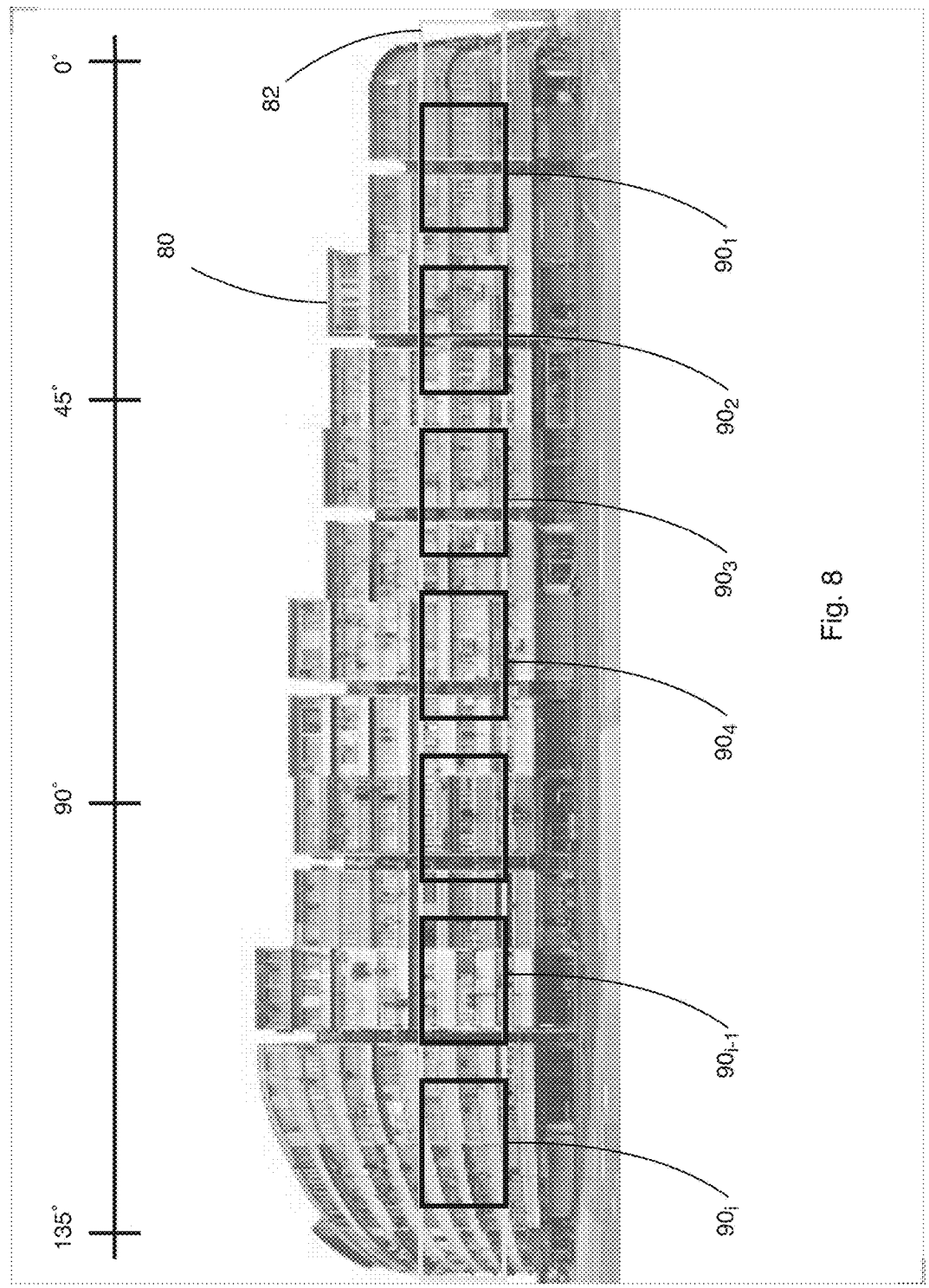
FIG. 8 illustrates resized display frames during a scan along the 180° composite field of view, providing zoom-in views at an apartment level elevation.

Once a display frame 58 is adjusted to a satisfactory field of view angle and elevation, the user may further control the vision system 10 with a third cue to initiate horizontal scans in the manner described for FIGS. 5A and 5B. FIG. 8 illustrates display frames 58 during a scan along the 180° composite field of view left of the 0° center point. The frames 58 are resized to provide zoom-in views at the apartment level elevation 82 shown in FIG. 5A. FIG. 8 shows a subset in a series 90$_i$ of the resized display frames 58 which are sequentially presented on the display 18L. The scan may pass through the entire 180° left camera vision field of view. While in the scan mode the user may provide cues to control field of view angles to zoom-in or zoom-out, as well as elevation cues to adjust the angle above the ground plane at which to center an enlarged image on the display. When a horizontal scan is underway, the user may initiate both the vision system resize mode and the elevation control to simultaneously sequence through reduced field of view angles and elevations.

Each imaging module 24 performs object detection as described in U.S. Pat. No. 8,934,680, "Face Tracking For Controlling Image Parameters" to Corcoran, et al.; U.S. Pat. No. 8,995,715 "Face or Other Object Detection Including Template Matching" to Sultana, et al.; U.S. Pat. No. 9,242,602 "Rear View Imaging Systems for Vehicle" to Corcoran, et al.; and U.S. patent application Ser. No. 15/591,321, "Multi-Camera 360° Vision System and Method of Monitoring", each incorporated herein by reference. The vision system 10 continually performs object detection through 360° fields of view, with full camera resolution to optimally identify objects of interest among multiple classes and to characterize activities to improve risk awareness. In the scene of FIG. 7A, the vision system 10 detects and classifies the sniper 74, and then displays an enlarged image of the portion of the scene containing the sniper. The vision system also displays the path of the sniper leading to the most current position. More generally, based on classification criteria applied with a series of hardware template matching engines (TMEs), the object detection process identifies a class of persons having a high likelihood of carrying a rifle 98 or other large weapon, and the object tracking indicates the path of movement of a detected person of interest.

FIG. 7B illustrates the display frame window 70$_5$ of FIG. 7A, which the GPU 52L augments with markings to highlight movement of a detected object of interest. The markings illustrated in the FIG. 7B are boxes, but may be other shapes. The boxes indicate a trail of recent object positions and the current object position. Markings may be color coded or vary in size to indicate a sequence of changes in object position. For example, a largest shape may indicate the most current object position. Generally, when it is determined that an object of interest has been moving in a scene, the display frame images are augmented to illustrate a recent path of movement.

A current object position of the sniper 74 is marked in FIG. 7B by placing a relatively large and noticeable box frame 94 about the image of the sniper. A sequence of progressively smaller box frames 96 extends away from the larger frame 94, indicating the path taken by the sniper. More generally, the current sniper position may be distinguished from earlier positions in the trail by changes in size or color of markings. The trail may be presented with multiple colors to more clearly indicate the direction of movements. The system performs temporal sequences of detections and risk assessments which include detection of movements of persons along roof-top regions or between apartment units and into cover. Movements of relatively small objects, such as the rifle 98 held by the sniper 74, can be determined with image enhancements for presentation in the enlarged display frames 58. When an object category of particular importance is identified, the vision system automatically modifies the field of view, e.g., responsive to the specific object class (person, vehicle, etc.) or subclass. With the class or subclass indicative of a level of potential threat, the system 10 may zoom in on the object to enable the user to better assess the threat.

The vision system 10 controls scanning with other user head gestures. A quick twist of the head to the left initiates a slow scan through the full 180 degree left peripheral view for viewing on the display 18L. A quick flick to both right and left initiates contemporaneous scans through the left and right 180 degree peripheral views, enabling the wearer to use camera vision to simultaneously monitor scans through both the left and right peripheral views on the displays 18L and 18R. The vision system 10 may also incorporate optical and sensor based enhancements, including a set of low-light infrared camera modules (or by incorporating an infra-red mode in the imaging modules 24) to provide a system suitable for night-vision or use in low-light indoor or urban environments. Inclusion of depth sensing technology can enhance the detection and classification of image features and objects.

Example embodiments of the invention have been illustrated, but the invention is not so limited. Numerous equivalents may be substituted for elements disclosed in the example systems. The invention has been described with reference to particular embodiments to provide understanding of inventive concepts and underlying principles. It will be recognized by those skilled in the art that the concepts and principles of operation can be readily extended to create many other vision systems providing enhanced performance and functionality. Embodiments may combine different claims. Combinations of different embodiments are within the scope of the claims and will be apparent to those of ordinary skill in the art after reviewing this disclosure. The invention is not limited to the described embodiments, which may be amended or modified without departing from the scope of the present invention. Rather, the scope of the invention is only limited by the claims which follow.

The claimed invention is:

1. A portable system providing augmented peripheral vision for awareness of surroundings, comprising:
   a helmet permitting a user wearing the helmet to receive a first field of view in the surroundings based on optical information received with the user's natural vision directly from the surroundings without digital video processing;
   a plurality of camera units, mounted about the helmet to generate multiple channels of video data, each camera channel capturing a different field of view of a scene in a region surrounding the helmet; and
   processing circuitry coupled to generate a composite field of view from some of the channels of video data, where said processing circuitry comprises a first processing unit coupled to receive the video data, and automatically (i) provide images of the scene for presentation on display units based on programmably adjustable fields of view, (ii) detect an object of potential interest based on predefined criteria, and then (iii) change the camera field of view to provide an enlarged image of the object,
   where the first field of view subtends an angle directly in front of the user's head and the cameras are positioned along a surface of the helmet to provide a peripheral view of the surroundings to the left of the first field of view and to provide a peripheral view of the surroundings to the right of the first field of view.

2. The system of claim 1 where the cameras include adjustable settings and the circuitry controls the camera settings for acquiring the video data.

3. The system of claim 1 where the adjustable camera settings are taken from the group consisting of optical field of view angles, exposure and selection between visible and infra-red image acquisition.

4. The system of claim 1 where said cues provided by the user are taken from the group consisting of voice commands, a touch interface and user movements, and where the user movements may include head gesture movements based on movements of the helmet sensed as time varying velocity or acceleration.

5. The system of claim 4 where the display functions controlled by the user cues include selecting portions of the scene, selecting a scene field of view angle along a ground plane, selecting an angle of elevation for a scene field of a view and presentation of a scan through a composite field of view of the scene on the display.

6. The system of claim 1 where the processing circuitry performs a combination of functions comprising:
   optical image stabilization through controlled movement of lens optics in the camera units;
   detection and identification of objects by processing of the video data;
   tracking movements of detected objects; and
   displaying of time varying position data representative of movement of a tracked object.

7. The system of claim 6 where movement of identified, tracked objects includes movement of a detected and identified person and the person is tracked by display of a series of frames indicative of a path traversed by the person.

8. The system of claim 7 where tracking of the movement of the identified person distinguishes a current [sniper] position from earlier positions in a trail by changes in size or color of markings presented with an associated image of the scene on one of the display units.

9. The system of claim 8 where an image showing a current position of the identified person is displayed within a relatively large and noticeable frame about the person and a sequence of progressively smaller box frames extends away from the relatively large frame, indicating a temporal path taken by the identified person.

10. The system of claim 7 where the trail is presented with multiple colors to more clearly indicate the direction of movements.

11. The system of claim 7 where a temporal sequence of detections is performed by the system.

12. The system of claim 7 where the system is configured to provide the temporal sequence of detections which can include detection of movements of persons along roof-top regions or between apartment units of a building.

13. The system of claim 7 configured to detect movements of a relatively small object, at least the size of a rifle, in the possession of the person, such detection determined with image enhancements or presented in an enlarged display frame.

14. The system of claim 6 wherein:
   detection and identification of objects is based on object categories for classification; and
   when an object category is identified, the vision system automatically modifies the field of view responsive to the specific object category and an associated level of potential threat, to zoom in on the object, thereby enabling the user to better assess the threat.

15. The system of claim 6 configured to continually perform object detection through 360 degree fields of view to identify objects of interest among multiple classes and to characterize activities to improve risk awareness.

16. The system of claim 1 where the processing circuitry includes image classification criteria to identify an activity in the group consisting of a person carrying a weapon, a person positioned on a building rooftop, and a person having moved between building units which are along an exterior surface of a building and above ground level.

17. The system of claim 1 where the circuitry controls field of view angles of image information for display by digital magnification of the video data.

18. The system of claim 1 programmed to identify object types present in the viewing region based on application of matching template engines and scan window detection.

19. A portable system providing augmented vision of surroundings, comprising:
   a helmet permitting a user wearing the helmet to receive a first field of view in the surroundings based on optical information received with the user's natural vision directly from the surroundings without digital video processing, said first field of view subtending an angle directly in front of the user's head;
   a plurality of camera units, mounted about the helmet to generate multiple channels of video data, each camera channel capturing a different field of view of a scene in a region surrounding the helmet;
   processing circuitry coupled to generate a composite field of view from some of the channels of video data, said processing circuitry comprising:
   a first processing unit coupled to receive the video data, and automatically (i) provide images of the scene for presentation on display units based on programmably adjustable fields of view, (ii) detect an object of potential interest based on predefined criteria, and then (iii) change the camera field of view to provide an enlarged image of the object, memory for temporary storage of the video data received by the processing unit, a first display unit including a first graphics processing unit responsive to the first programmable processing unit to generate a composite field of view based on the acquired video data and provide portions of the composite field of view for presentation on the display unit, where each presented portion of the composite field of view is an image of the scene based on a predetermined or selected field of view and a predetermined or selected field of view angle subtending a corresponding portion of the scene, a second display unit, and a second graphics processing unit, wherein, said first graphics processing unit generates a first segment of the composite field of view based on a second field of view angle subtending the peripheral view of the surroundings to the left of the first field of view, for presentation on the first display unit; and said second graphics processing unit generates a second segment of the composite field of view based on a third field of view angle subtending the peripheral view of the surroundings to the right of the first field of view, for presentation on the second display unit, sensors, which provide velocity or acceleration information to the circuitry, indicative of changes in walking or running motion of the user, and where the circuitry
  (i) applies the velocity or acceleration information to calculate the speed at which the wearer of the helmet walks or runs and
  (ii) changes display presentations in response to user speed of movement.

20. The system of claim 19 where, when motion of the user reaches a threshold speed, the display is automatically modified to present smaller portions of the composite field of view corresponding to smaller field of view angles in the scene.

21. The system of claim 19 where, when motion of the user diminishes below a threshold speed, the system displays the entire composite field of view.

* * * * *